(12) United States Patent  
Sallee et al.

(10) Patent No.: US 6,302,355 B1
(45) Date of Patent: Oct. 16, 2001

(54) MULTI SPECTRAL IMAGING LADAR

(75) Inventors: Bradley Sallee; Joe Gleave, both of Austin, TX (US)

(73) Assignee: BAE Systems Integrated Defense Solutions Inc., Austin, TX (US)

( * ) Notice: Subject to any disclaimer, the term of this patent is extended or adjusted under 35 U.S.C. 154(b) by 0 days.

(21) Appl. No.: 09/432,994

(22) Filed: Nov. 2, 1999

(51) Int. Cl.⁷ .................. F41G 7/20; F42B 15/01
(52) U.S. Cl. ............. 244/3.16; 244/3.15; 244/3.17; 342/54; 342/63
(58) Field of Search .................... 244/3.1, 3.13, 244/3.15–3.22; 701/200, 207, 223; 356/5.1, 5.11–5.15, 140, 141.1–141.5, 142–149, 4.01; 340/540–564; 342/52–58, 61–65, 175, 176, 179, 189, 190–196

(56) References Cited

U.S. PATENT DOCUMENTS

| | | |
|---|---|---|
| 4,195,289 * | 3/1980 | Cole ............................ 340/554 |
| 4,410,237 | 10/1983 | Veldkamp . |
| 4,436,260 | 3/1984 | Donelan ........................ 244/3.16 |
| 4,682,024 | 7/1987 | Halldorsson et al. . |
| 4,787,748 | 11/1988 | Rioux . |
| 5,198,919 | 3/1993 | Reeder . |
| 5,283,796 | 2/1994 | Fink . |
| 5,289,493 | 2/1994 | Fink . |
| 5,317,148 | 5/1994 | Gray et al. . |
| 5,345,304 | 9/1994 | Allen . |
| 5,387,996 | 2/1995 | Palombo . |
| 5,477,383 | 12/1995 | Jain . |
| 5,528,354 | 6/1996 | Uwira . |
| 5,543,954 | 8/1996 | Nicholson . |
| 5,644,386 * | 7/1997 | Jenkins et al. ................ 356/4.01 |
| 5,710,658 | 1/1998 | Jacobson et al. . |
| 5,779,187 | 7/1998 | Dulat ............................ 244/3.16 |
| 5,870,180 | 2/1999 | Wrangler . |
| 5,892,575 | 4/1999 | Marino . |
| 6,042,050 * | 3/2000 | Sims et al. .................... 244/3.17 |
| 6,163,372 * | 12/2000 | Sallee et al. .................. 356/5.1 |

* cited by examiner

*Primary Examiner*—Bernarr E. Gregory
(74) *Attorney, Agent, or Firm*—Locke Liddell & Sapp LLP

(57) ABSTRACT

One aspect of the invention relates to a laser ranging system. In one embodiment, the invention includes a laser adapted to transmit a beam of laser radiation to a target area, a plurality of apertures for receiving reflected laser radiation from the target area, each aperture being coupled to a start tank circuit by a start optical fiber, the start optical fibers being substantially the same length for each aperture in the plurality, an oscillator, a receive phase comparator circuit that determines the phase difference between the output signals from the start tank circuit and the oscillator, a transmitter tank circuit that generates and output signal responsive to the transmission of the laser radiation, a transmit phase comparator circuit that determines the phase difference between the output signals from the transmitter tank circuit and the oscillator, a pulse counter circuit that counts the number of pulses generated by the oscillator between transmission of the laser beam and the receipt of the signal from the start tank circuit, and a distance measuring circuit that calculates the distance from laser ranging system to the target based upon the number of pulses counted by the pulse counter, the phase difference determined by the receive phase comparator circuit and the phase difference determined by the transmit phase comparator circuit.

13 Claims, 15 Drawing Sheets

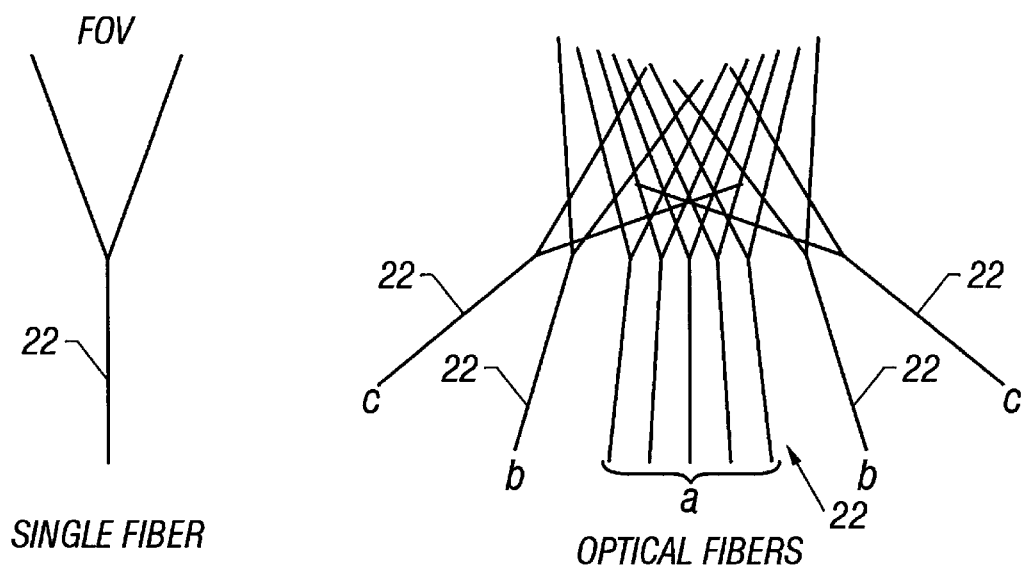
FIG. 5
FIG. 6
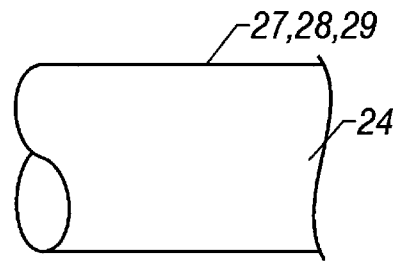
FIG. 7
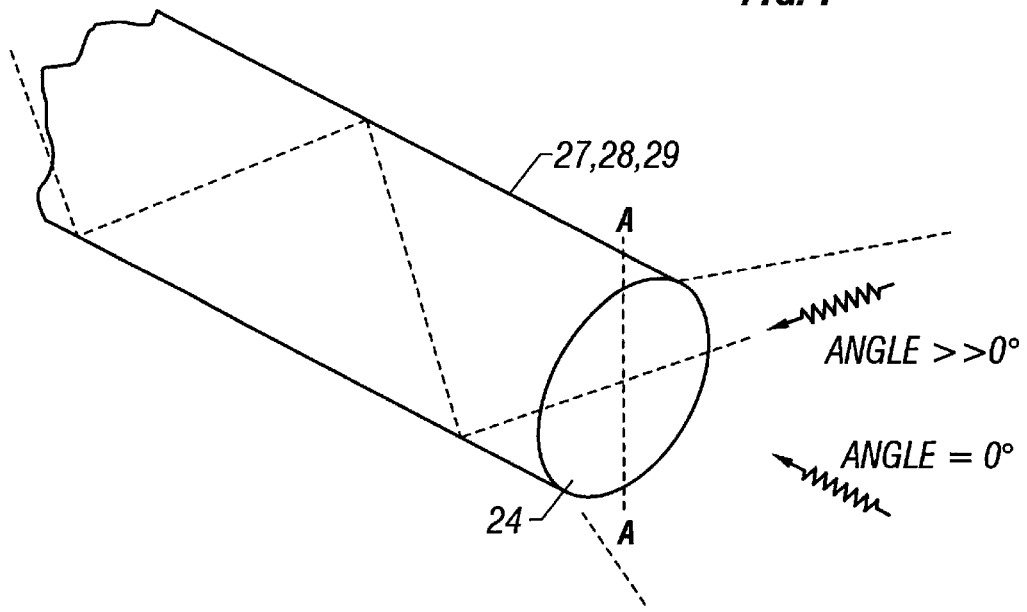
FIG 7A

MULTI SPECTRAL IMAGING LADAR

CROSS REFERENCE TO RELATED APPLICATIONS

Not Applicable

STATEMENT ON FEDERALLY SPONSORED RESEARCH OR DEVELOPMENT

Not Applicable

BACKGROUND OF THE INVENTION

1. Field of the Invention

The field of the invention relates to devices for creating a three-dimensional image using a coherent, monochromatic electromagnetic radiation (LASER). In particular, the invention relates to a new and improved fiber optic LADAR (LASER detection and ranging) system, coupled with a MULTI SPECTRAL analyzer. It can be used to provide information to guidance systems for vehicles, such as guided missiles, that distinguishes objects based on their chemical composition.

2. Description of the Prior Art

The use of optical target detectors utilizing laser light is disclosed in U.S. Pat. No. 5,014,621, issued May 14, 1991 to Fox, et al. and assigned to Motorola, Inc. This patent utilizes a star coupler to automatically align pencil laser beams upon a target, and to track the target based on reflections of the laser light.

The use of missile referenced beam-rider guidance links is disclosed in U.S. Pat. No. 4,696,441, issued Sep. 29, 1987 to Jones, et al. and assigned to the United States of America. Jones et al. discloses a laser beam in which the strength of the beam is formed into a gaussian cross-section, the beam is directed upon a target at short range, detectors on an in-flight missile detect and measure the strength of the laser beam, and a guidance system guides the missile along the beam by adjusting the guidance controls to maximize the detected strength of the beam.

A detector device for detecting the presence and originating direction of laser radiation is disclosed in U.S. Pat. No. 4,825,063, issued Apr. 25, 1989 to Halldorsson et al. and assigned to Messerschmitt-Bolkow-Blohm GmbH. The Halldorsson device includes a plurality of discrete light collection optics, each discrete optic being capable of gathering laser radiation over a certain solid angle, which overlaps the solid angle of its neighbors.

The above mentioned patents are incorporated by reference as though set forth in full. None of the systems disclosed in these prior art patents provide the features disclosed in the following specification.

BRIEF SUMMARY OF THE INVENTION

An object of the invention is to provide three-dimensional image information to a vehicle guidance system. In one version of the invention, a laser beam illuminates the target. Optical fibers on the vehicle collect optical signals reflected from the target. These reflected optical signals are connected to electrical signals and transmitted to an on-board vehicle guidance and flight control system that directs the vehicle to its target.

In one embodiment, the vehicle includes high power laser transmitter coupled with a fiber optic laser receiver incorporating collection optics. These structures may be packaged in any convenient way as a matter of design choice. For example, if the vehicle is a self-guided missile, then the laser transmitter and fiber optics laser receiver may be packaged in a compatible nose cone. A laser beam is projected from the missile and scanned across the target area in a predetermined pattern. In particularly advantageous embodiment, the pattern is a spiral scan around the center of the target area, although any pattern could be used as a matter of design choice. Laser light is reflected from the target back to the missile where it is received and analyzed by the misses guidance system.

The guidance system includes a staring array of apertures for receiving laser tank circuit by an elevation optical fiber. The length of the start optical fibers is the same for all apertures in the staring array. The length of the azimuth optical fibers is related to the azimuth angle of the received laser radiation from their respective apertures. Similarly, the length of the elevation optical fibers is related to the elevation angle of the received laser radiation from the respective apertures. The outputs from the tank circuits are then passed to intermediate frequency amplifiers and phase comparators. Signals from the phase comparators are then sent to a processor on the missile which uses these signals to develop a three-dimensional image of the target area.

The guidance systems also includes a non-linear crystal frequency convertor. When the laser beam is projected towards the target, it is first passed through the nonlinear crystal frequency convertor so that a single beam of two frequencies of light is projected. When the returning laser light is received by the missile, it is passed to two separate start tank circuits. The start tank circuits are provided with optical filters so that each start tank circuit is activated by a different frequency of incoming laser light. The outputs of the start tank circuits are used for two purposes in an advantageous embodiment of the invention. First, the outputs are summed together and used in conjunction with the azimuth and elevation tank circuits to allow the missile to construct a three-dimensional image of the target area. Second, the energy level of the outputs of the two start tank circuits is compared to determine a reflectivity ratio. The reflectivity ratio determined from the incoming light may be compared against known reflectivity ratios of objects likely to be found on a battlefield, such as various types of paint, shrubbery, grasses, rocks, asphalt, etc. The missile can use the information, not only to determine the shape and distance of the object, but also to determine what the object is.

By way of illustration, important features of the present invention will be described with respect to its application in self-guided missiles. However, those with skill in the art will appreciate that the invention could easily be applied to other vehicles, such as an underwater torpedoes or manned vehicles, as a matter of design choice.

These and other features of the present invention will be more apparent from the following detailed description.

BRIEF DESCRIPTION OF THE SEVERAL VIEWS OF THE DRAWINGS

FIG. 5 is a schematic view of a single optical fiber together with a representation of its field of view in accordance with the invention.

FIG. 6 is a schematic view of a group of arrayed optical fibers all having approximately the same field of view, showing how the fields of view of the arrayed fibers overlap in accordance with the invention.

FIG. 7 is a schematic, magnified sectional view of the light receiving end of an optical fiber in accordance with the invention, including a representation of the path light rays might take through the fiber, depending on the angle of incidence of the light ray relative to the longitudinal axis of the fiber and how that is modified by gain optics.

FIG. 7A is a diagram illustrating an optical fiber receiving light energy from different angles.

DETAILED DESCRIPTION OF THE INVENTION

With reference now to the drawings, a new and improved fiber optic LADAR system of particular utility for a guided missile will be described. While the present invention is described in terms of embodiment as a laser guided missile guidance and control system, it is to be understood that the invention is not so limited, being applicable to any vehicular guidance and control or imaging LADAR system which images a target in three dimensions using a LASER scanner and fiber optic receiver. In the missile example, the electromagnetic radiation obtained is laser light, but other substantially monochromatic radiation could be employed. Also, in the missile example, the laser light detected by the receiver of the guidance system has been reflected from the target towards which the missile is being guided. It is to be understood that the laser or other substantially monochromatic radiation may be generated at or by the target, rather than being reflected from the target or generated by another platform. In this case only azimuth and elevation information of the target is available. Light generated and transmitted from the vehicle allows the receiver to generate range data. Further, it is preferred that the light source be capable of firing rapid on/off or intermittent bursts, as with known laser targeting systems. The wavelengths of light useful in the invention range from the ultraviolet to the far infrared, and are preferably those wavelengths transmitted through the atmosphere with minimum interference by the normal components of the atmosphere.

Figure 1:
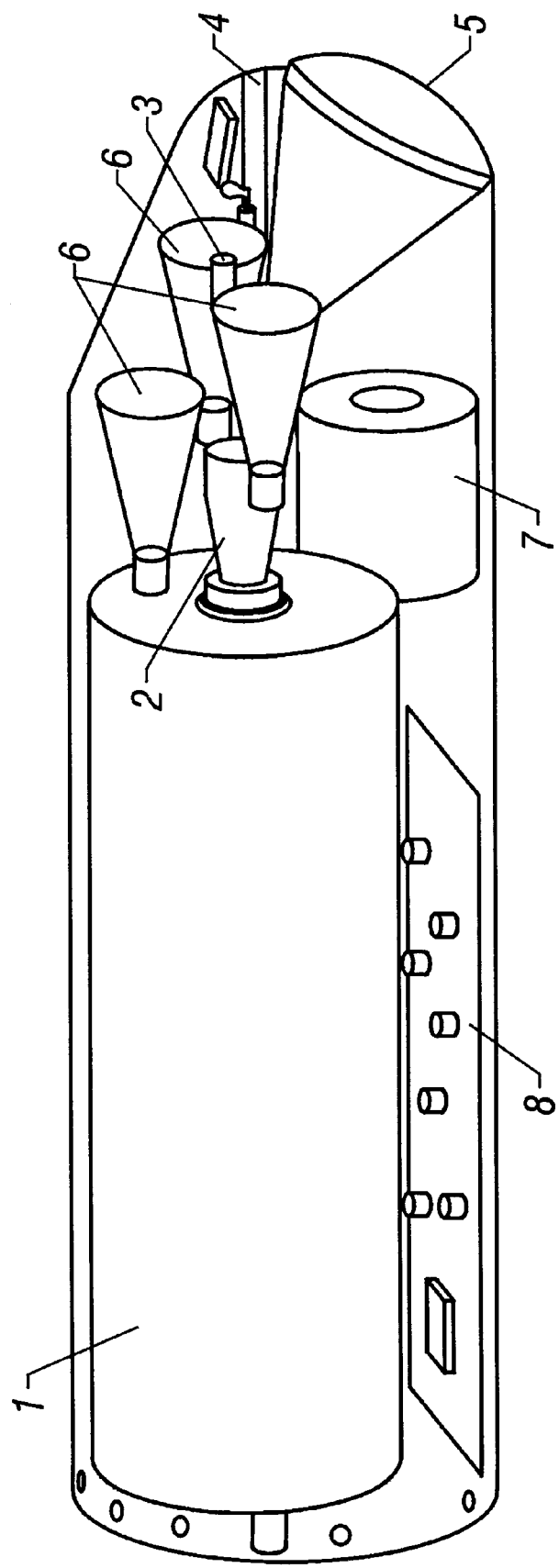
FIG. 1 is a cutaway view of a laser guided missile according to an embodiment of the invention.

FIG. 1 shows a guided missile fitted with a LADAR guidance system according to one embodiment of the invention. The LADAR guidance system comprises three major hardware components, the laser transmitter, the scanner, and the receiver. The laser transmitter is composed of the laser 1, a telescope 2 and the laser scanner 3. A typical implementation would use a high power solid state laser, for example, 50 kilowatts peak, with a high repetition rate, for example, 25 to 50 kHz. The pulse width should be as short as possible for optimum operation, for example, 8 nanoseconds. The laser beam passes through a non-linear crystal, an OPO in one embodiment, which shifts part of the laser energy to another frequency. The output of the laser is passed through a telescope 2 to expand the beam and lower the divergence to the desired level. This controls the spot size at the target range. The receiver is composed of optical collecting elements 5 and 6, a fiber delay spool 7, and the electronics/processor board 8. During the search mode, a "push-broom" scan, i.e., side-to-side, is used, and the reflected energy is received through the push-broom collecting lenses 5. The energy passes through the fiber optic delay lines on the fiber spool 7 and is sensed and processed on the electronics/processor board 8. After target acquisition, the missile goes into a "homing" mode. In homing mode, the LADAR uses a raster or spiral scan pattern using the scanner 3, and receives the reflected energy using the three, overlapping field of view homing optics 6. The received energy then follows the identical path as in the pushbroom mode, i.e., through the fiber optic delay spool 7 and to the electronics/processor board 8.

Figure 2:
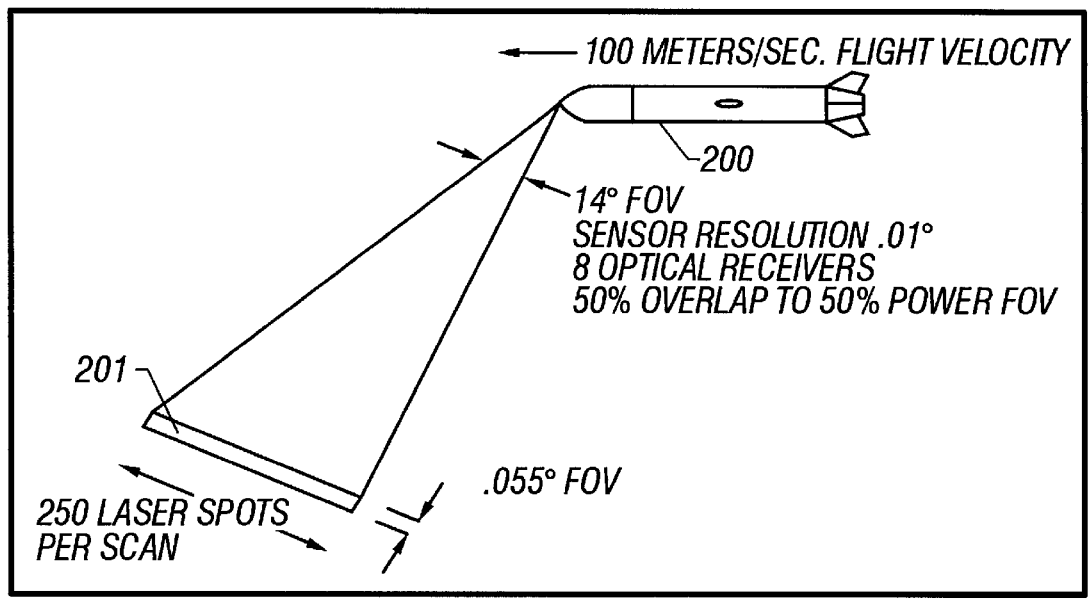
FIG. 2 is a diagram depicting a laser operating in pushbroom mode according to an embodiment of the invention.

The search mode, illustrated in FIG. 2, uses a push-broom scan, which, in one exemplary embodiment, the laser beam is directed forward and 30° downward from the direction missile 200 is traveling. In the embodiment shown, the scanning laser illuminates a cross-range row 201 of 250 spots that overlap at 50% power in clear conditions. The number of spots and overlap are, obviously, a matter of design choice. If the spots are pulsed at a 25 kilohertz rate, this yields a push-broom sweep rate of 100 hertz. If the forward velocity is 100 meters-second, the spots overlap in the velocity direction at the 50% power. The receiver operates with a field of view ("FOV") matching the laser spot scan, in the illustrated case, 14° azimuth and 0.055° FOV at 50% gain. The receiver can detect the cross-range target power centroid to 0.01° accurately at a maximum track range, improving to 0.0034 degrees (or the digitization limit) at close range. The range may be detected to an accuracy of at least 0.002 meters.

Figure 3A:
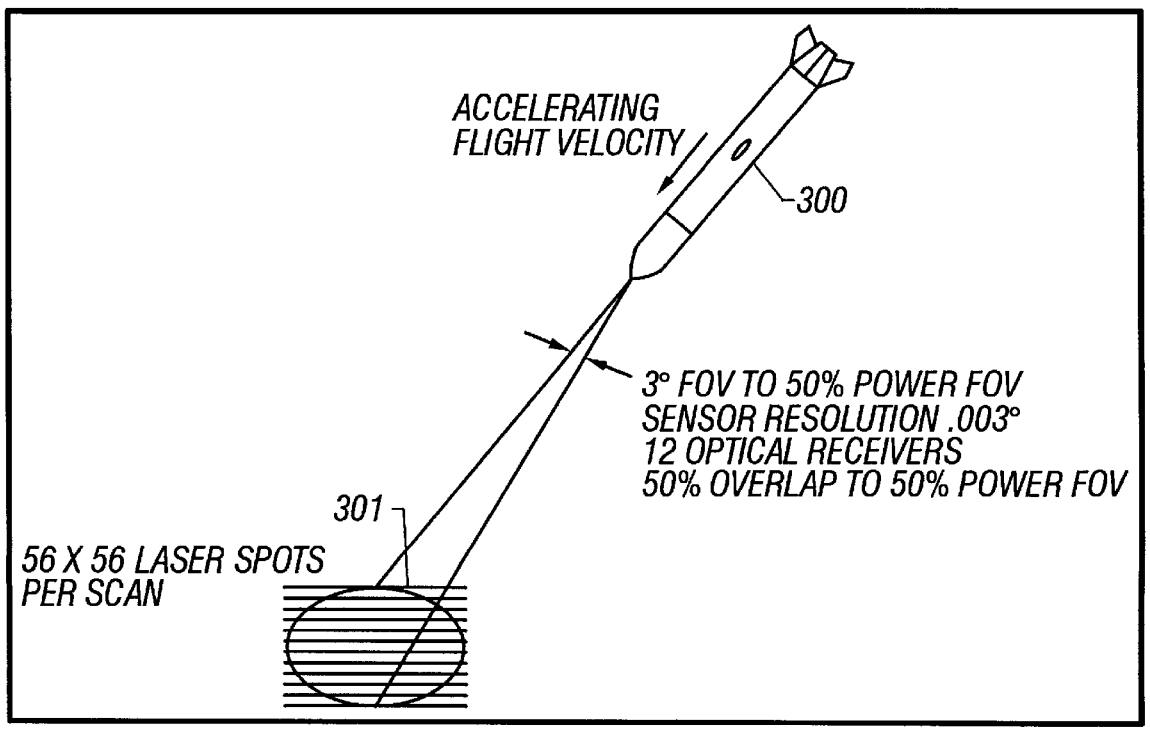
FIG. 3A is a diagram illustrating a missile operating in homing mode according to an embodiment of the invention.
Figure 3B:
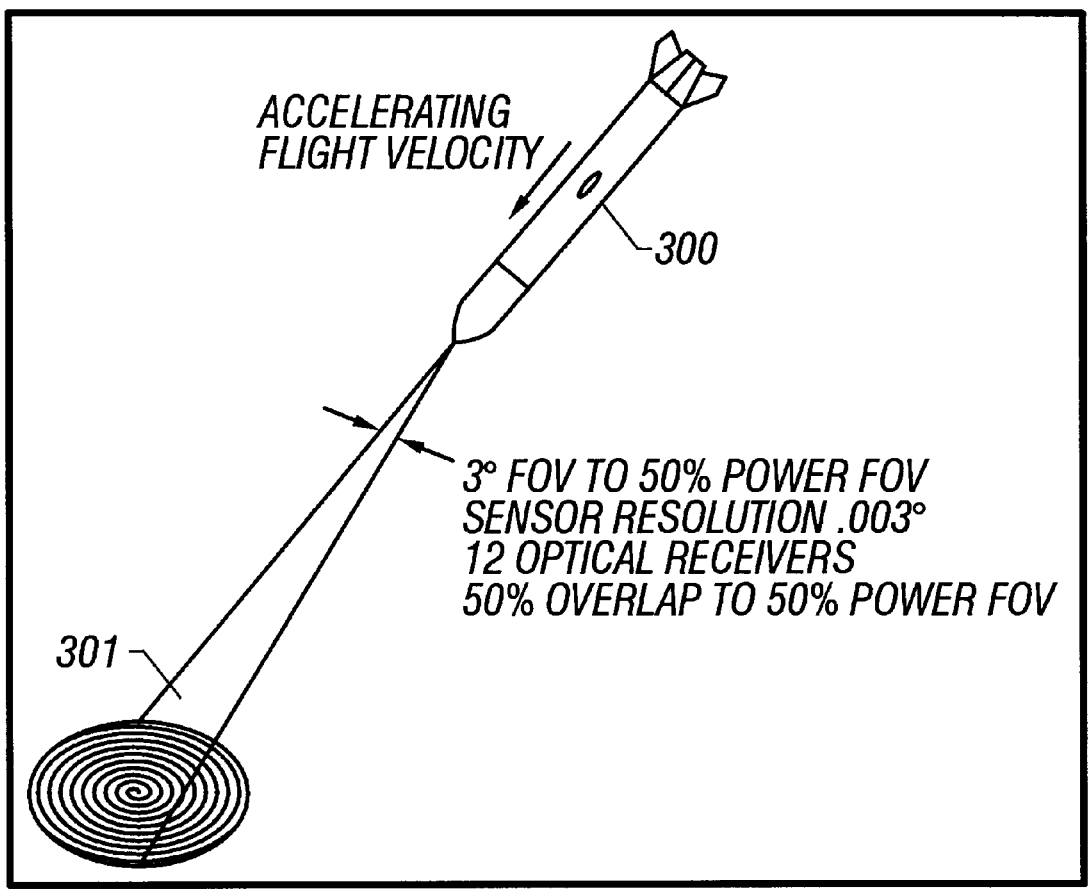
FIG. 3B is a diagram depicting a missile operating in homing mode according to still another embodiment of the invention.

After a target has been identified, the LADAR is switched to the homing mode shown in FIG. 3. This mode uses a forward staring field of view sensor in the missile 300. In one advantageous embodiment, the staring sensor is provided with a nominal 3° FOV at the 50% power point. The laser scanner is switched to a raster scan, creating a 55 by 55 spot square 301, each spot overlapping at 50% power. The receiver then detects the target power centroid in azimuth and elevation to 0.003° accuracy, decreasing to a digitization limit of 0.007° as the signal-to-noise level increases. The homing mode range accuracy is the same as in the search mode.

In one version of the invention, the laser beam passes through a non-linear crystal frequency converter before passing through the telescope 2. A suitable non-linear crystal frequency converter would be an OPO style converter. These converters are well-known in the art. Unlike typical OPO converters, which block the original laser frequency, the present invention transmits both the shifted frequency and the original laser frequency. This not only allows two desired frequencies to be transmitted, but doubles the overall efficiency of the converter.

After passing through the converter, the beam comprises two distinct frequencies of laser light. It should be noted that, although the invention will be described with respect to a two-frequency version, it is easily adaptable to use with multiple frequencies as a matter of design choice. In the two-frequency version, it is advantageous to separate the frequencies by a significant margin to allow greater discrimination of the reflectivity ratio. For example, one frequency is in the infrared region and the other is in the blue/green region of the electromagnetic spectrum.

Figure 17:
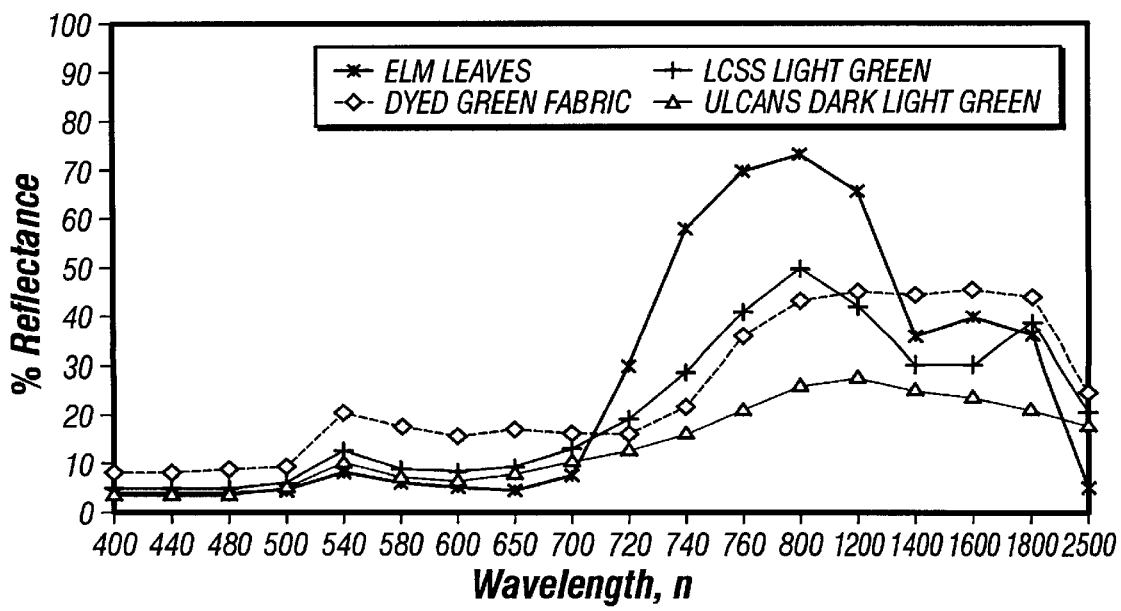
FIG. 17 is a chart showing a reflectance comparison of different items over a wavelength of 400–2500 nm.

Alternately, if reflectivity ratios are known for specific objects to be targeted by the missile, then the frequencies could be tuned for maximum discrimination. For example, FIG. 17 is a chart plotting the percent reflectance of certain objects for specified frequencies of light ranging from 400 to 2500 nanometers. The chart shows elm leaves reflect about 70% of the optical energy at 1200 nm and about 30% at 1600 nm. By contrast, dark light green camouflage net reflects about 30% of the received light energy at both frequencies. Thus, a missile using a bi-chromatic laser beam of 1200 nm and 1600 nm could easily discriminate between elm leaves and a camouflage net, i.e., the reflectivity ratio would be approximately 70/30 for elm leaves and only about 1/1 for the camouflage. It should be noted that the frequency absorption of smoke, fog and other obscurants tend to be flat with changes in frequency, therefore, they do not tend to add to the frequency shift detected by the invention.

Distinguishing man-made objects from natural background is another advantageous feature of the invention. Foliage commonly has a rise in reflectivity at about 700 nm. This is sometime referred to as the "chlorophyll peak" and is depicted in FIG. 17. Modem camouflage systems often try to mimic this chlorophyll rise to make detection of the hidden object more difficult by spectral analysis. But, as known to those of skill in the art, there are other frequencies that are inherently difficult to match with a camouflage system because of the difficulty in creating suitable binders, i.e., the chemical components that cause the pigmentation in camouflage paint to adhere to the underlying object. These frequencies may be selected as a matter of design choice depending on the particular paint chemistry an enemy is believed to be using at the time.

Figure 8:
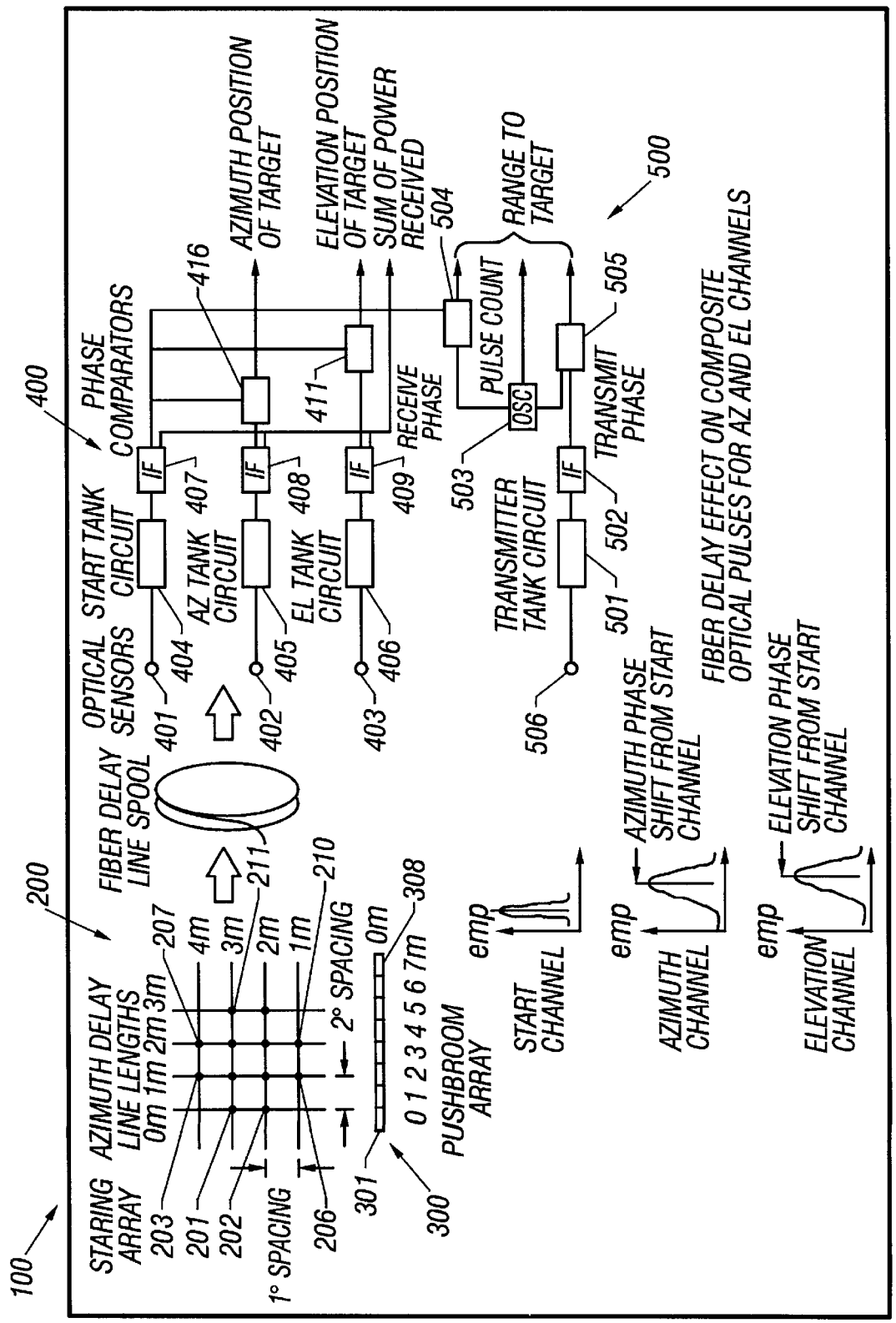
FIG. 8 is a schematic diagram illustrating the aperture arrays and image receiving circuits according to an embodiment of the invention.

Referring to FIG. 8, the laser receiver consists of five subcomponents, the collection optics or apertures allowed into the staring overlay 200 and pushbroom array 300, the delay lines, the tank circuits, the IF circuits 402, 409 and 502, and the phase comparators. Each collection optic of the staring and push broom arrays feeds into a set of three fiber optic delay bundles, a start bundle, an azimuth stop bundle, and an elevation stop bundle. The start bundles from each collection optic are coupled to a start sensor 401. Similarly, the azimuth stop and elevation stop bundles are coupled to corresponding sponsors 402, 403. The fiber optic delay lines increase in length linearly from the lower left corner of the FOV of the staring array 200 to the upper right hand corner. Thus, in one illustrative embodiment, a target received near the lower left corner would have zero azimuth and zero elevation delay relative to the start signal, and one near the upper right corner would have 18.69 nanoseconds of optical delay using four meters of fiber at 2.14 E8 meters-second. Because of the overlapping FOVs, and the linearly varying delay line length, the azimuth and elevation position is linearly varying with the delay time from the start signal power centroid to the azimuth stop and elevation stop signals power centroids. By integrating in a longer row of bottom sensors, i.e., the push broom array 300, both arrays can use the same sensors and electronics with no switching or gimbles.

The range to target is acquired by measuring the phase of the output signal from the transmit pulse tank circuit 501 against a local oscillator 503, and then counting whole oscillator pulses until the receipt of a signal from the start tank circuit 404. The signal phase from the start tank circuit is also measured against the local oscillator (the "receive phase"). Thus, the total range is the transmit phase plus the receive phase plus the number of whole pulses. This technique allows range measurements to an accuracy of about 0.002 meters.

The receiver is also designed having a tank circuit with the ability to integrate a power centroid versus time signal from the sum of the delay line pulses fed to it. The phase of the start tank circuit relative to the azimuth and elevation tank circuits is measured. This allows the receiver to achieve a linear transfer function from angular position to delay time measure by the phase shift. The IF circuit provides a logarithmic power receiver output in addition to its squaring function for phase measurement by the phase detector.

Figure 4:
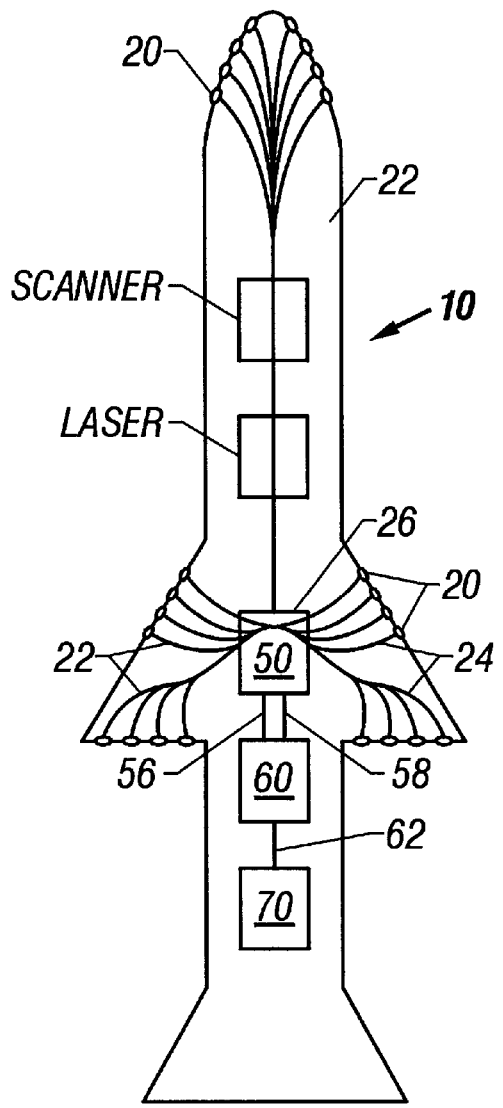
FIG. 4 is a schematic plan view of a missile, including a plurality of exemplary locations for light-receiving apertures each containing optical fibers, distributed on leading and tailing edges of the fins or wings, and on the nose of the missile thereof, in accordance with the invention.
Figure 4A:
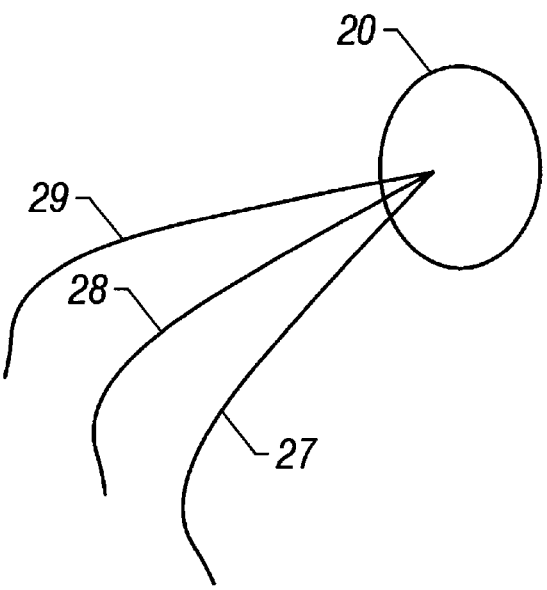
FIG. 4A is a diagram illustrating a plurality of optical fibers attached to an aperture according to an embodiment of the invention.

FIG. 4 is a schematic plan view of a vehicle, such as a missile 10, incorporating an array of apertures 20 each containing one set of a plurality of sets of optical fibers 22. At each aperture is disposed at least one start fiber and at least one stop fiber, or a single fiber which is subsequently split into at least one start fiber and at least one stop fiber. Preferably, as shown in FIG. 4A, each aperture 20 contains a set of fibers 22 consisting of three, or multiples of three, collinearly disposed fibers 27, 28 and 29, as described in more detail below. For simplicity, in the figures other than FIG. 4A, the drawing element depicted as "fiber" 22 is actually a set of three, or multiples of three, fibers, designated by reference number 22. The first of these three fibers is a start fiber 27, the second is an azimuthal stop fiber 28, and the third is an elevational stop fiber 29. The number of fibers in a set of fibers may be any integral multiple of three fibers, the number variable as needed to obtain adequate signal strength. A light receiving, or proximal, end 24 of each fiber in a set of three or multiples of three fibers is disposed at an individual aperture 20. The light receiving end 24 for a set of three fibers may be a single fiber which is split by a fiber splitter into the three fibers of a set of fibers 22.

Each of the plurality of individual optical fibers 27, 28, 29 includes the first, light receiving or proximal end 24, and a second, detector-attached, distal end 26. The distal end 26 is interfaced with a detector unit 50. The proximal light receiving end 24 functions to allow light to enter the fiber without the need for additional light gathering optical devices, if desired. Preferably, the light receiving end 24 has a flat, polished end, as best shown in FIG. 7, and it is the incoming radiation that strikes this surface which provides the input to the detector 50 and thence the guidance and control system 60, 70 of the present invention through communication lines 56, 58, 62. The field of view of each individual fiber 27, 28, 29 is determined primarily by its fiber numerical aperture, or the gain optics if used.

The aperture 20 may include a band pass filter, and or protective material which acts to protect the fiber from substances or conditions such as heat or cold, but any such protective material does not participate in light gathering in this version of the invention. As described below, the aperture may contain a single fiber end, which subsequently is split into three fibers, or it may contain three separate, discrete fibers, or multiples of three. Preferably each individual optical fiber 27, 28, 29 remains as a separate, individual fiber for its entire length. When multiples are used the same number of start, azimuth stop and elevation stop fibers are used. The range of integral multiples of the three types of fibers which might be used is limited only by the size of the aperture required to allow each fiber to receive the incoming radiation. Practically, the range of multiples may be considered to be between 2 and 100. Thus, a set of fibers may practically include 3, 6, 9, 12, 15 . . . 300 fibers. Preferably, each aperture is linked, via the set of optical fibers 22, to three individual detectors via the distal fiber ends 26. The three individual detectors, to be described below, are preferably contained within the detector unit 50 shown in FIG. 1. Preferably if multiples of three fibers are used in the set, the same multiple of each fiber arrives at each detector.

Each fiber is preferably made from standard clad optical fiber material typically having a diameter of approximately 125 microns to 400 microns. These diameters are exemplary only, and various other diameters may be used, as will be understood by those in the art.

Referring now to FIG. 5, each fiber 22 has a characteristic field of view as schematically shown in FIG. 2. The field of view of a fiber depends primarily upon its numerical aperture. The numerical aperture acts to weaken and block incoming light rays or source signals emanating from an illuminated source, with the degree of weakening increasing until the signal is effectively blocked at an angle that exceeds the angle defined by the field of view associated with the numerical aperture. It is understood that while FIG. 5 illustrates the field of view in only two dimensions, the actual field of view of the fiber 22 is conical, in three dimensions. Whenever this specification refers to a field of view, the actual field is a three dimensional cone, with the apex of the cone at the first end 24 of the fiber 22. Light reaching the first end 24 from within the cone is within the field of view of the fiber.

Referring now to FIG. 6, a plurality of optical fibers is shown arrayed to provide varying degrees of overlap of the fields of view of the individual fibers. In FIG. 6, all the fibers have substantially the same field of view, but this is not necessarily or preferably the case. The field of view, of the various fibers in the arrayed plurality of fibers may be selected to provide the degree of accuracy in determination of target direction required for a given direction relative to the vehicle. In other words, the accuracy in a given direction may be controlled by selection of, inter alia, the field of view of the fibers pointing in that direction, and by selection of the degree of overlap of adjacent fields of view. As suggested by the positions and orientations of the fibers, the five fibers near the center of the array, designated as the "a" group in FIG. 6, will provide the highest accuracy in determining of the position of or direction to a target near the center of their field of view. The next outwardly positioned two fibers, designated as the "b" group in FIG. 6, are both oriented in a different direction and overlap to a different degree with the adjacent fibers than do the fibers in the "a" group. These "b" group fibers provide a lower accuracy than do the "a" group fibers. Finally, the next outwardly positioned two fibers, designated as the "c" group, are oriented in yet another direction, and have fields of view with less overlap with adjacent fibers in groups "a" and "b." The "c" group fibers provide less accuracy than the "b" group fibers. Note that the numerical aperture of these groups of fibers may be selected so as to increase or decrease the available field of view of any of the fibers shown in FIG. 6. Likewise, additional fibers may be added, the fibers may be provided with other orientations, fields of view, and degrees of overlap with adjacent fiber fields of view, resulting in directionally selectable accuracies, in accordance with the selected parameters.

Referring now to FIG. 7, a schematic drawing is shown of the light-receiving end 24 of the fiber 22. As is shown in FIG. 7A, preferably the end of the fiber is flat, and most preferably has been polished to a high degree so as to avoid distortion or loss of entering optical signals. As used in this disclosure, the angle of incidence of incoming radiation is defined as the angle formed between the direction of propagation of the radiation and the central longitudinal axis of the fiber at or near the end of the fiber. It is well known to those in the art of fiber optics that the more interaction an optical signal traveling in a fiber has with the walls of the fiber, the more the strength of the optical signal is attenuated. As is shown in FIG. 7A, an optical signal entering the fiber at an angle of incidence at or close to zero degrees will travel through the fiber with a minimum of interaction with the walls of the fiber and with a minimum of attenuation due to the effect of the refractive index of the optical fiber, and so will be attenuated very little by the passage. Also shown in FIG. 7A, an optical signal entering the fiber at an angle of incidence substantially greater than zero degrees will undergo many interactions with the wall of the fiber and will be significantly affected by the refractive index of the optical fiber, and so will be attenuated to a greater degree than optical signals entering at angles closer to zero degrees from the longitudinal axis of the fiber.

Figure 7B:
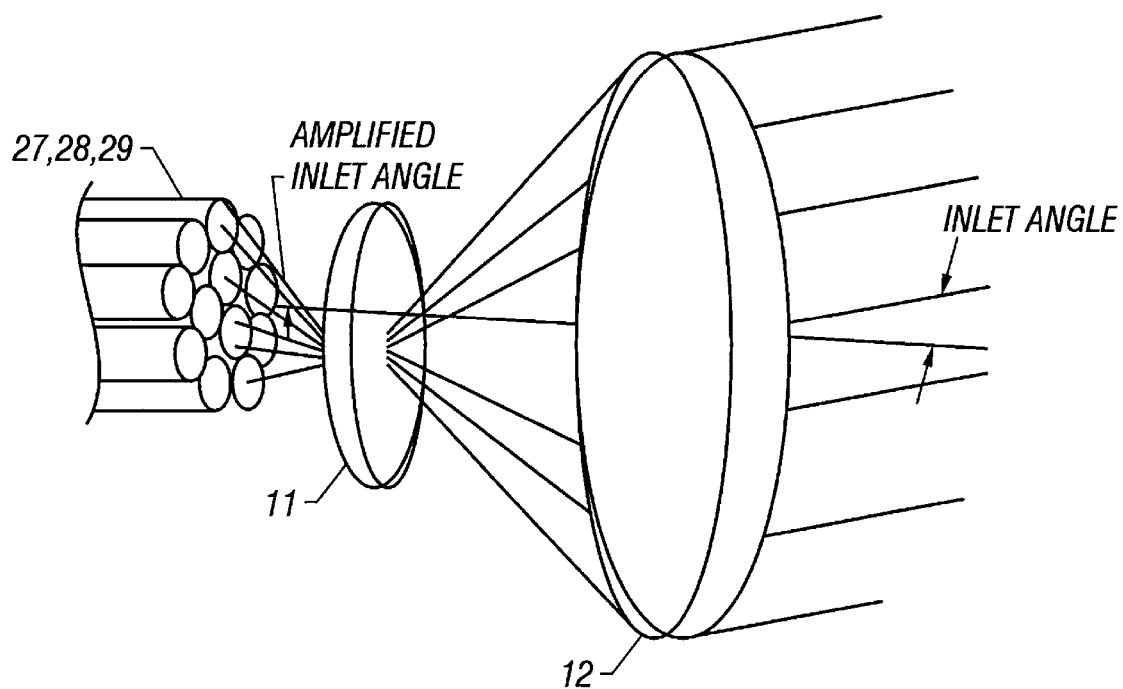
FIG. 7B shows the beam contractor optics.

The radiation incident upon the end 24 of the fiber 22 will be further attenuated to a small but finite degree as a result of reflection of the incident radiation from the outer surface of end 24. The degree of attenuation due to reflection will vary with the angle of incidence, and other factors known to those in the arts . Such attenuation should also be constant for a given fiber at a given wavelength and so provides further information to the microprocessor in accurately determining the direction to the source. For higher optical gain, a beam contractor may be used as seen in FIG. 7B. This is composed of two piano convex lenses 11 and 12. The effect is to increase the optical amplitude by the area ratio of lens area 12 to 27, 28, 29 fiber receive area. It also increases the angle of the light energy on the fiber ends proportionate to their input angle, increasing the angular accuracy of the system.

As FIGS. 7A and 7B suggest, for radiation incident upon the end 24 of the fiber 22, the strength of the optical signal initially entering the fiber 22 will be affected by the angle of incidence of the arriving radiation for another reason. If the radiation arrives at an angle of 0°, as shown in FIG. 7A, the end 24 of the fiber 22 appears to form a round disc if the fiber is round. Thus the "target," into which the radiation must enter to form an optical signal in the fiber, appears as a circle. By contrast, when radiation of the same wavelength arrives at the same end 24 of the fiber except at an angle substantially greater than zero degrees (0°), as also shown in FIG. 7A, less of the incoming radiation can enter the end 24 of the fiber 22, simply because the "target" from this angle forms an ellipse having an apparent area smaller than a circle. The width of the ellipse becomes smaller with increasing angle of incidence. Thus, simply because the "target" is smaller, and less radiation will enter the fiber. This effect is in addition to the effect of the refractive index and other physical variables such as reflection which contribute to the attenuation of the signal indexed by the numerical aperture.

As a result of these attenuation effects arising from and related to the angle of incidence, optical signals arriving at the detector will have a signal strength related to the angle of incidence. The exact relationship between angle of incidence and attenuation will vary depending on the material from which the optical fiber is made and on the wavelength of the incoming radiation, but should be reproducible for a particular fiber and laser combination, and being the same for both start and azimuth and elevation stop fibers allows accurate determination of the directional relationship between the vehicle and the radiating target. This is the result of the attenuation of overlapping field of view optics being added to the make the composite azimuth and elevation stop signals through their respective delay lines.

One embodiment of the invention will be described with respect to FIG. 8. In this embodiment, the missile is provided with a staring array 200 and a pushbroom array 300 to receive incoming laser radiation.

The staring array 200 includes an array of twelve apertures 201–212 which are to be arranged in a forward looking position on the missile. Of course, any number of apertures could be provided as a matter of design choice. Each aperture in the staring array 200 is provided with at least three separate fiber optic cables or lines that connect the aperture to the optical sensors 401–403. More specifically, each aperture includes a start line that is coupled to optical sensor 401, an azimuth delay line coupled to optical sensor 402, and an elevation delay line that is coupled to sensor 403. The start line length for all apertures is the same and preferably contains no additional length to delay light signals from being passed from the apertures to optical sensor 401.

The apertures 201–212 arranged into azimuthal columns and elevational rows. In an azimuthal column, each aperture in the column has the same length azimuth delay line. The length of the azimuth and elevation delay lines is varied from column to column, or row to row, as the case may be. For example, in the left-most column in the starring array 200, the azimuth delay lines for apertures 201 and 202 are connected to optical sensor 401 with no added length to delay the received laser light from reaching the sensor 401. One meter of additional length is added for each column so that in the right-most column, the azimuth delay lines for apertures 211 and 212 have 3 meters of additional length. This additional length may be conveniently wound around a spool for physical placement in the missile. Thus, when laser light strikes the array 200, light from apertures 201 and 202 will arrive at optical sensor 402 first, followed sequentially by light from the other azimuthal columns. Similarly, for the elevational rows, apertures 206 and 210, in the lower-most elevational row, are provided with an elevation delay line length of 1 meter. The elevation delay line length increases from row to row until apertures 203 and 207 are provided with elevation delay lines of 4 meters. It should be noted that here is no "0" length delay line for elevational lines because this is reserved for the pushbroom array.

The pushbroom array 300 includes eight apertures 301–308. As with the staring array, the apertures 301–308 are connected by start, azimuth and elevation delay lines to the optical sensors 401–403, respectively. However, unlike the staring array, the pushbroom array uses the vehicles forward velocity to scan the three-dimensional image in one axis. Accordingly, there is only one elevational row needed by the pushbroom array. Thus, the elevation delay line length is 0, i.e., no additional delay, for all apertures in pushbroom array. The same is true for the start line. Since the elevation delay line length is one meter for the lowest row in the staring array, the missile can distinguish signals received from the staring array from those received by the pushbroom array. This will be described in greater detail further herein.

In an exemplary embodiment, the center lines of the FOV of the apertures in the pushbroom array 300 are separated by 1.75 degrees, giving the entire array a 14 degree FOV. Each aperture overlaps the center line of its nearest neighbors at the 50% power points, yielding good angle resolution.

Light striking the staring array 200 is passed through the fiber optic cables to optical sensors 401–403 as described above. These signals are then processed through the image processing circuit 400. Imaging processing circuit 400 contains a start tank circuit 404, an azimuth tank circuit 405 and an elevation tank circuit 406, each attached to its corresponding optical sensor. The optical sensors and tank circuits will be described in greater detail with respect to FIGS. 9A–9C. The outputs from the tank circuits are passed to IF amplifiers and then to phase comparators. Suitable phase comparators will occur to those skilled in the art. The phase is then digitized for use in the image processor according to techniques known in the art.

There is also provided a range finding circuit 500 which is used in conjunction with the imaging circuit 400 in order to allow the missile to form an accurate three dimensional image of the target, as well as determine the exact range of the missile to the target. The range finding circuit 500 includes a transmitter tank circuit 501 connected to an intermediate frequency amplifier 502. The construction of the transmitter tank circuit 501 and IF amplifier 502 are substantially similar to corresponding circuits used in the image circuitry 400. The range finding circuit also includes an oscillator 503, a receive phase comparator 504 and transmit phase comparator 505. The receive phase comparator 504 compares the phase difference between an oscillating signal from the oscillator 503 and a signal received on the start line of the staring array 200 that initiates an oscillation of start tank circuit 404. Similarly, transmit phase comparator 505, compares the difference in phase between a signal from oscillator 503 and an outgoing signal detected by creating an oscillation of transmitter tank circuit 501. In one embodiment, oscillation of transmitter tank circuit 501 is initiated by passing optical energy from the outgoing laser beam on to the optical sensor 506. When these two phases are combined with the pulse count, the total time from transmit to receive can be accurately calculated.

Figure 10:
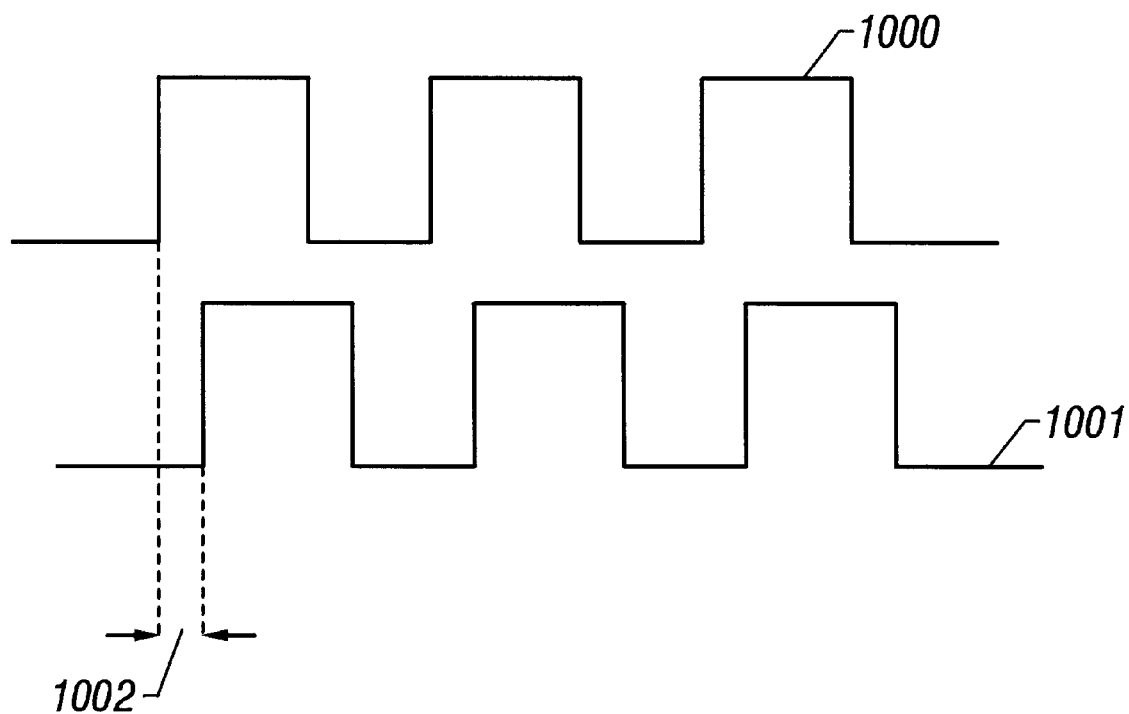
FIG. 10 is a timing diagram illustrating the phase difference between the local oscillator signal and the signal received from the start tank circuit.

In operation, an onboard laser is fired in a forward looking direction from the missile. When the outgoing laser signal is transmitted, it is also passed to optical sensor 506. At the same time, other circuitry on the missile (not shown) begins counting pulses from oscillator 503. The phase of the broadcast laser signal is compared to the phase of the oscillator 503 by transmit phase comparator 505. Other circuitry on the missile determines the phase broadcast time. The phase broadcast time is shown in FIG. 10. FIG. 10 is a timing diagram depicting the phase difference between the signal from the transmitter tank circuit 1000 and the standard oscillator signal 1000 from oscillator 503. The phase difference between these two signals is the phase broadcast time 1002.

Figure 11:
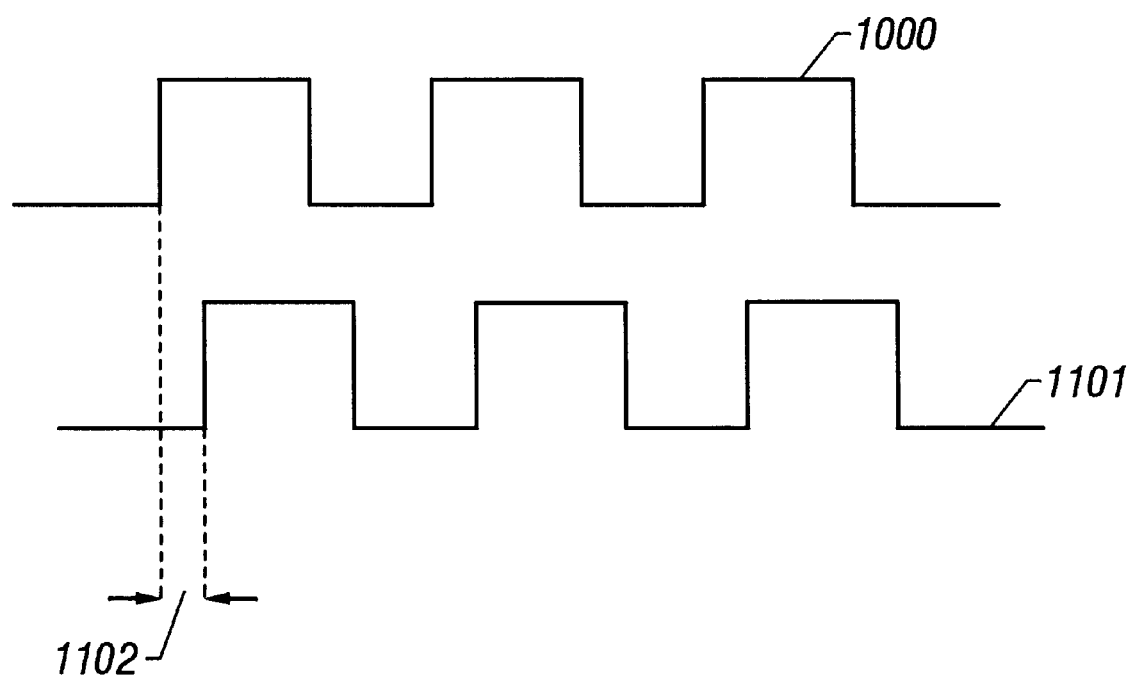
FIG. 11 is a timing diagram illustrating the phase difference between the local oscillator signal and the signal generated by the transmitter tank circuit.

The broadcast laser signal is then reflected off a target, returned to the missile and then detected by either the staring array 300 or the pushbroom array 200 depending on the mode of operation of the missile. Since there is no delay in the start line of either array, the signal from the start line is passed through optical sensor 401 through tank circuit 400 and eventually to receive phase comparator 504 where it is also compared against the signal from oscillator 503. This is depicted in the timing diagram shown in FIG. 11. FIG. 11 shows the timing diagram for the received pulse 1100 detected by the start lines of the staring array and the clock signal 1000. The phase difference, or the phase receive time 1102 is shown in the figure.

With this information, the missile can then calculate the time to the target based upon the number of cycles counted from oscillator circuit 503 plus the phase broadcast time 1002 and the receive broadcast time 1102. With this information, the range to the target can be calculated as accurately as $1.879 \times 10^3$ meters.

It is preferable that the longest delay time of any optical fiber is not more than about 60° of the ring frequency of the tank circuit that it is coupled to. This is because it is desirable that all energy from all apertures is passed to the tank circuits during the time the outputs from the tank circuits are initially rising in response to this received energy. In other words, the energy received from reflected laser pulse appears as a single pulse input to the tank circuits. In this way, the phase shift of the output from the azimuth and elevation tank circuits, relative to the output signal from the start tank circuit, will be directly proportional to the power centroid of the received pulse. Since the power centroid of the received pulse is determined by the amount of laser energy received at each aperture in the array, the phase shift can be used to determine the azimuth and elevation of the incoming laser radiation, or, in the case of the pushbroom array, the azimuth of the incoming radiation.

This information can, in turn, be used by image processing electronics on the missile to generate an image of the target. More specifically, each laser pulse received by the missile apertures will have a particular azimuth and elevation determined by the phase shift of the signals generated by the azimuth and elevation tank circuits relative to the phase of the signal generated by the start tank circuit. This azimuth and elevation data is, in turn, used to specify a particular pixel on the image created by the missile from its field of view. Equipment and methods for creating an electronic image from the azimuth and elevation data is known to those of skill in the art and will not be described in detail herein. The imaging equipment provided on the missile also stores information related to the amplitude of the incoming laser radiation for the particular pixels identified by the azimuth and elevation information discussed previously. This information is used to generate gray scale information for the images according to known techniques. Moreover, the range information determined from the pulse count, transmit and receive phase information determined for each pixel, can be combined with the azimuth and elevation information to allow the missile to generate a three-dimensional image of the target area. In one advantageous embodiment, the length of each laser pulse is approximately 20 milliseconds.

Figure 9A:
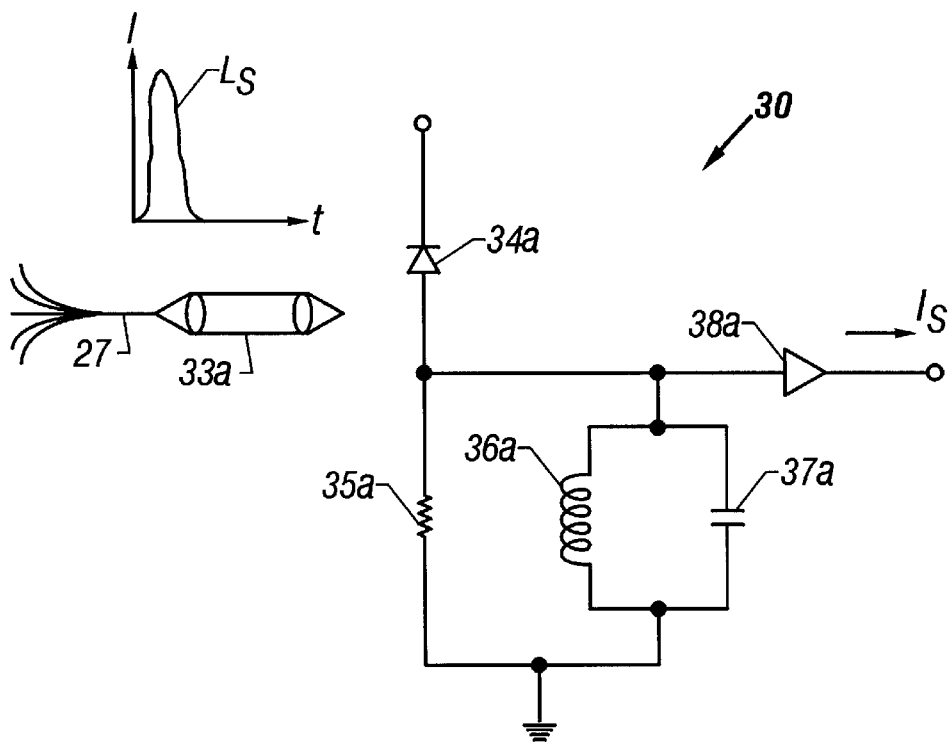
FIGS. 9A–9C are schematic diagrams illustrating the start tank circuit, the azimuth tank circuit and the elevation tank circuit.
Figure 12:
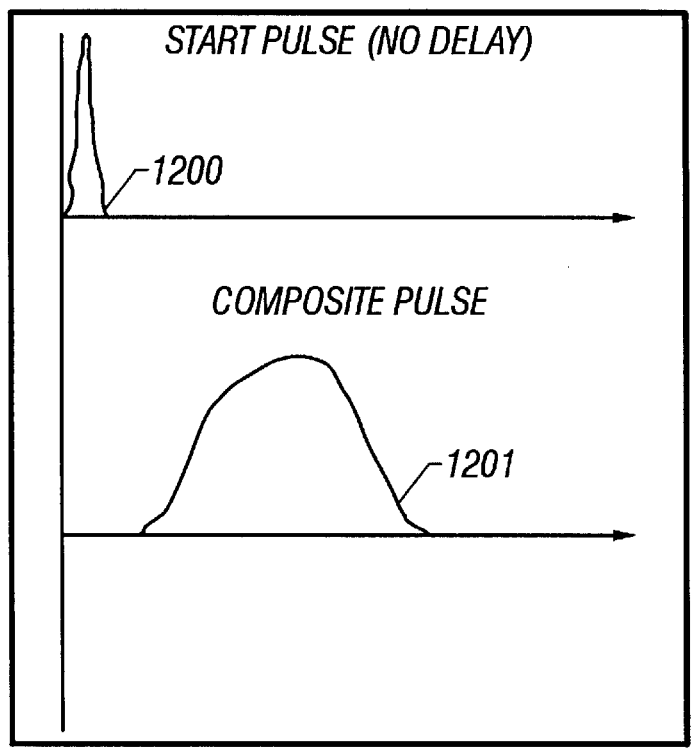
FIG. 12 is a timing diagram showing the start pulse and composite pulses applied to the tank circuits

As seen in FIG. 9A, the start fibers are guided to imaging optics 33a which images the front-face ends of these wave guides on a photo diode 34a, which is part of the start detector 30. The photo diode 34a is coupled in series with a damped resonant circuit comprised of a resistor 34a, coil 36a, and capacitor 37a. Additionally diode 34a and filter circuit 34a, 36a and 37a are coupled to an amplifier 38a at the output of which amplifier current $I_s$ flows. When a laser pulse impinges on the first, receiving end 24 of a group of start fibers in their apertures, an optical signal is transmitted over the start optical fibers receiving the signal . This pulse has the current response over time as shown in FIG. 9A and labeled $L_s$. This is shown in detail in FIG. 12, curve 1200. The damped resonant circuit has a ringing frequency which matches the pulse width of the incoming radiation. The damped resonant circuit output is a signal having set oscillation frequency with the amplitude and phase in accordance with that of the laser radiation striking the photo diode. The phase is set by the power centroid of the signal $L_s$. This is shown in detail in FIG. 13, curve 1300. This output constitutes a first, start input to a circuit for determining the time of arrival of incoming radiation and its amplitude.

In the preferred embodiment, the device comparing the start and each of the stop signals is a phase comparator chip. This output $I_s$ from the start damped oscillation circuit 34a, 36a and 37a constitutes one input leg to each of the comparators.

Figure 9B:
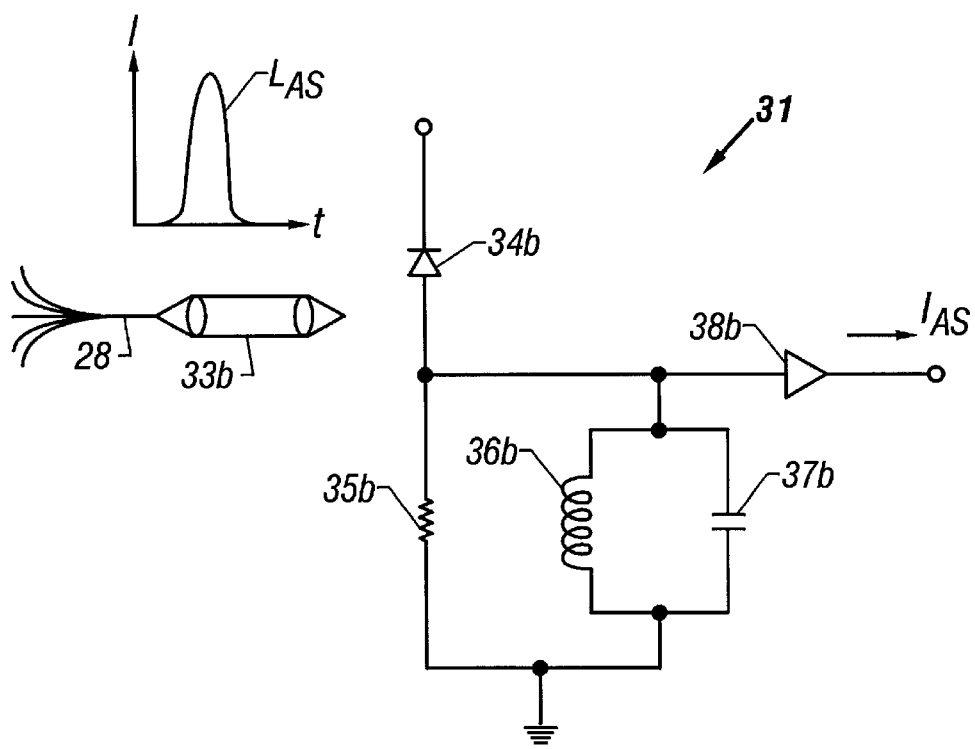

In FIG. 9B the azimuth stop fibers 28 are guided to imaging optics 33b which images the front-face ends of these wave guides on a photo diode 34b, which is part of the azimuth stop detector 31. The photo diode 34b is coupled in series with a damped resonant circuit comprised of a resistor 35b, coil 36b, and capacitor 37b. Additionally diode 34b and filter circuit 35b, 36b and 37b are coupled to an amplifier 38b at the output of which amplifier current $I_{AS}$ flows. When a laser pulse impinges on the first, receiving end 24 of a group of azimuth stop fibers in their apertures, an optical signal is transmitted over the azimuth stop optical fibers receiving the signal . This pulse has the current response over time as shown in FIG. 9B and labeled $L_{AS}$. This is shown in greater detail in FIG. 12, curve 1201. Here the stretch out of the pulse due to the delay line length is seen. The damped resonant circuit has a ringing frequency which matches the wavelength of the start circuit 9A. The damped resonant circuit output is a signal having a set wavelength with an amplitude and phase in accordance with that of the laser radiation striking the photo diode. The phase is set by the power centroid of signal $L_{AS}$, which has been time delayed from signal $L_s$ by the fiber delay line 28. It is shown in detail in FIGS. 13, curve 1301. This output $I_{AS}$ constitutes an azimuth stop input to a comparator for determining the apparent phase difference and time of arrival of the azimuthal component of the incoming radiation.

Figure 9C:
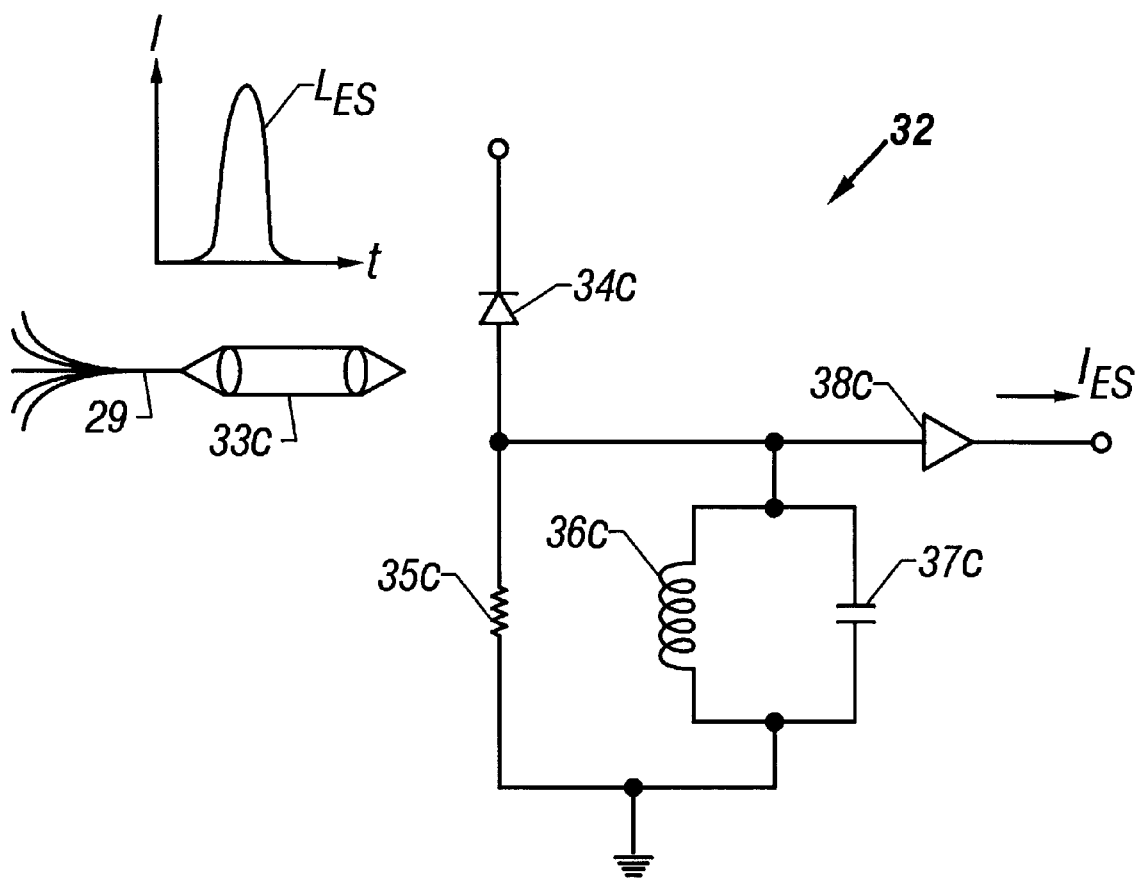

In FIG. 9C the elevation stop fibers 29 are guided to imaging optics 33c which images the front-face ends of these wave guides on a photo diode 34c, which is part of the elevation stop detector 32. The photo diode 34c is coupled in series with a damped resonant circuit comprised of a resistor 35c, a coil 36c, and a capacitor 37c. Additionally idiode 34c and filter circuit 35c, 36c and 37c are coupled to an amplifier 38c at the output of which amplifier current IES flows. When a laser pulse impinges on the first, receiving end 24 of a group of elevation stop fibers in their apertures, an optical signal is transmitted over the elevation stop optical fibers receiving the signal. This pulse has the current response over time as shown in FIG. 7C and labeled $L_{ES}$. The damped resonant circuit has a ringing frequency which matches the wavelength of the circuit 9A. The damped resonant circuit output is a signal having a set wavelength with an amplitude and phase in accordance with that of the laser radiation striking the photo diode. The phase is set by the power centroid of signal $L_{ES}$, which has been time delayed from signal $L_s$ by the fiber delay line 29. It is shown in detail in FIGS. 13, curve 1301. This output $I_{ES}$ constitutes an elevation stop input to a comparator for determining the apparent phase difference and time of arrival of the elevational component of the incoming radiation signal.

Figure 13:
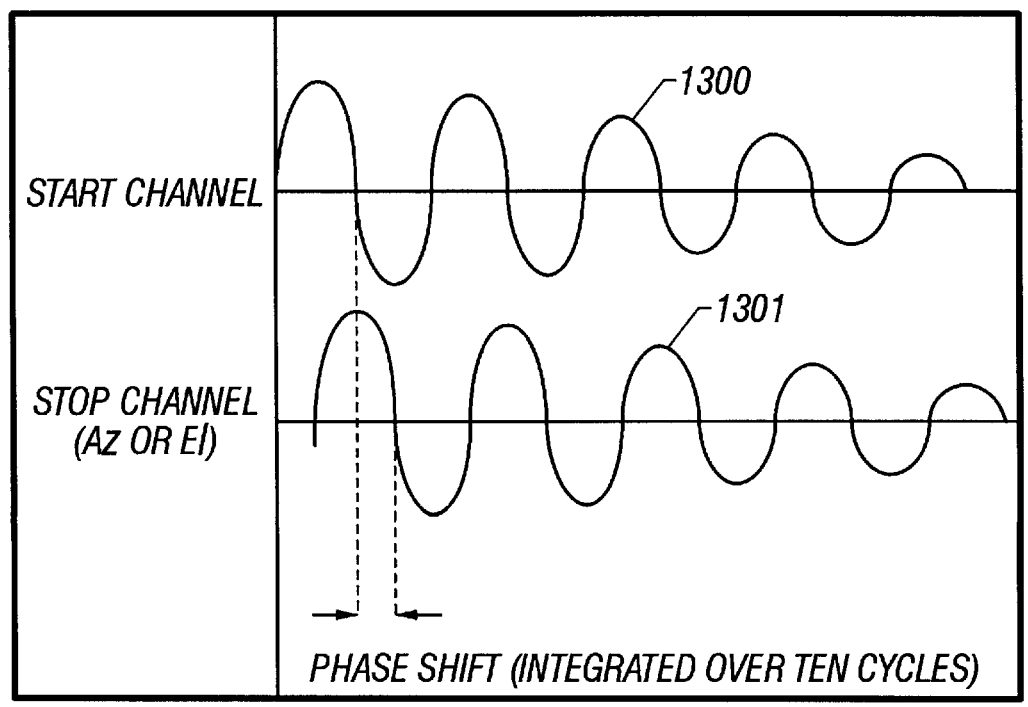
FIG. 13 is a timing diagram depicting the phase shift between the start channel signal and the azimuth and elevation channel signals.

The damped ringing circuit has the same resonant frequency as that described for the start circuit. As can be seen in FIGS. 9B and 9C the longer length of optical fibers 28 and 29 delays the arrival of the laser pulse on the receiver optics 33b, 33c and consequently on the photo diodes 34b, 34c. This is shown in greater detail in FIG. 12. The damped oscillation is consequently correspondingly delayed, and the signal produced from the damped circuit appears with a phase shift relative to that from the start detector. This is shown in FIG. 13. The difference between the phases of the start signal and each of the azimuth and elevation stop signals provide information on the azimuth angle and elevation angle of the incident radiation, and thus to the direction to the source of the radiation detected by the system.

Figure 15:
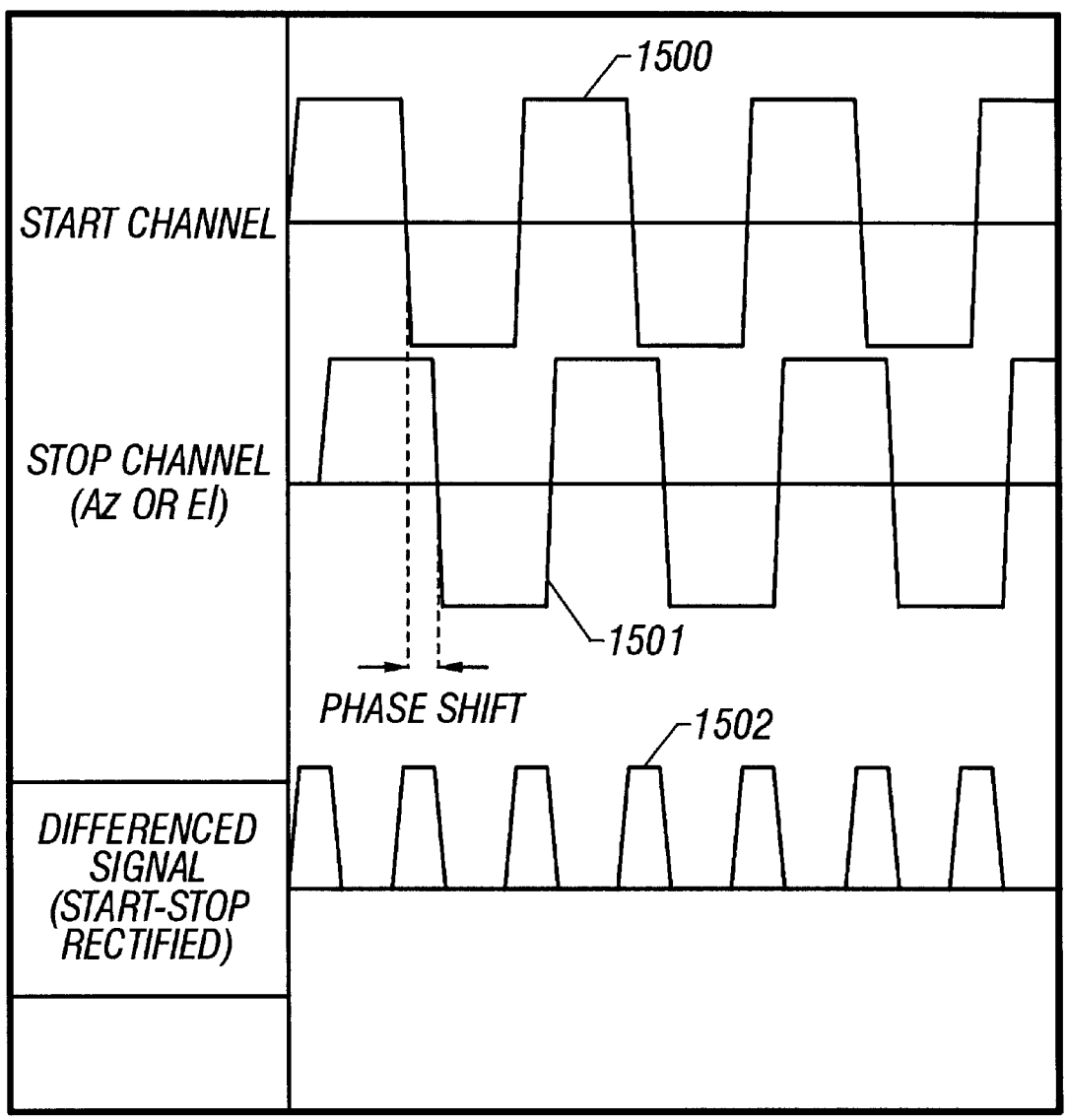
FIG. 15 is a timing diagram depicting the phase difference between the start channel signal and the elevation or azimuth channel signals after these signals are passed through the intermediate frequency ("IF") amplifiers. Also shown is the difference signal between the start and azimuth or elevation stop signals.

The output of the tank circuits is fed into IF amplifier stages. These narrow the bandwidth to eliminate noise, output a signal proportional to the log of the amplitude, and then amplify and chop the signals until they become square waves as shown in FIG. 15. At this point each signal has very low noise, and has the phase shift preserved. The phase comparator functions by differencing the two signals (i.e, start channel signal 1500 and with the azimuth or elevation signals, both represented by wave 1501) whose phase is to be compared. This is shown in FIG. 15, with the resultant signal 1502 having a duty cycle proportional to the phase shift. The differenced signal 1402 is then integrated over a number of cycles, typically 10. This further decreases the noise level, increasing the phase measurement accuracy. The phase is then the 10 cycle integral compared to a constant signal. The integrated signal is digitized for input into the computer image processing.

Figure 14:
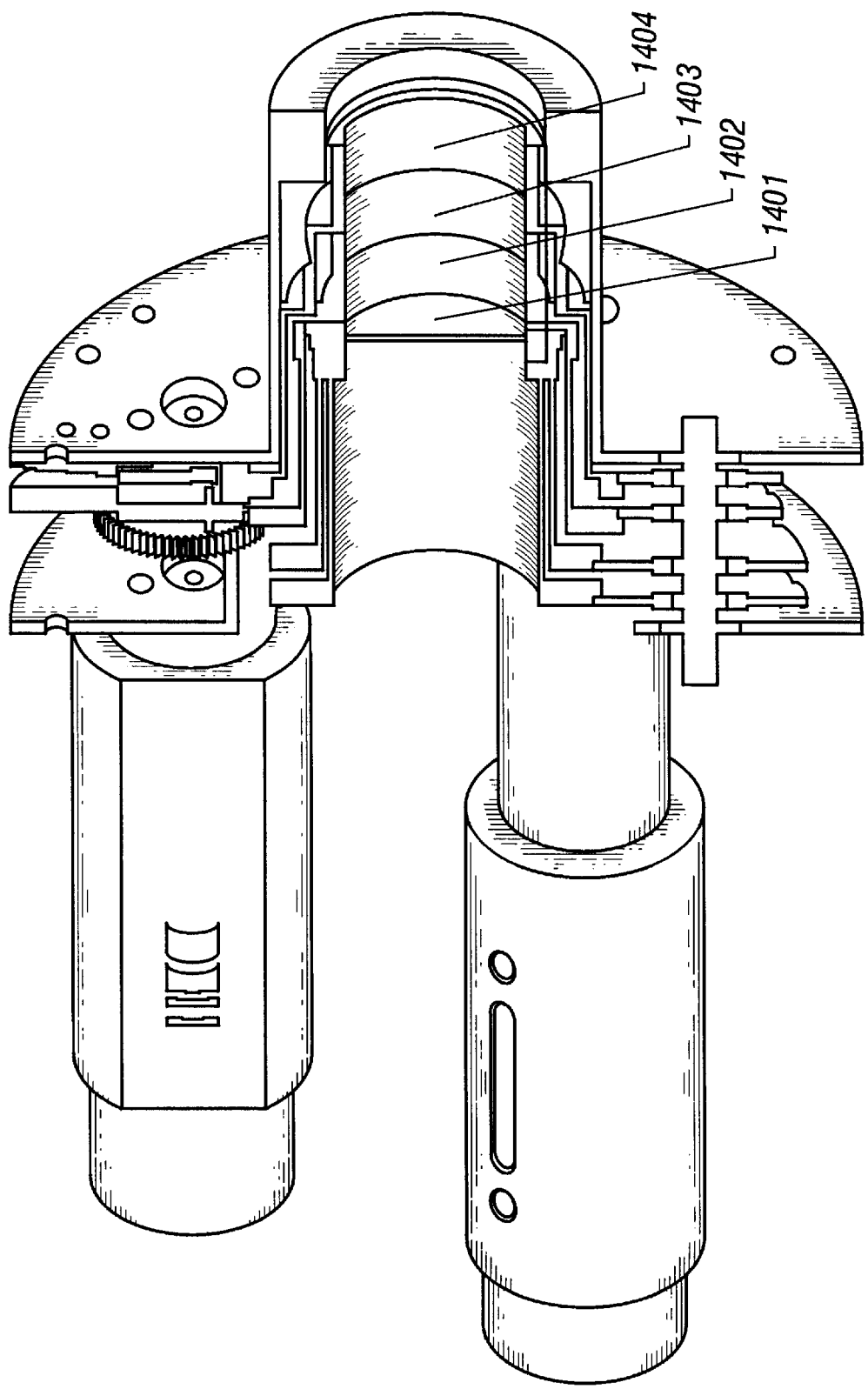
FIG. 14 is a cutaway view of an optical device for transmitting laser beam in a number of programmable patterns from a guided missile according to an embodiment of the invention.
Figure 14A:
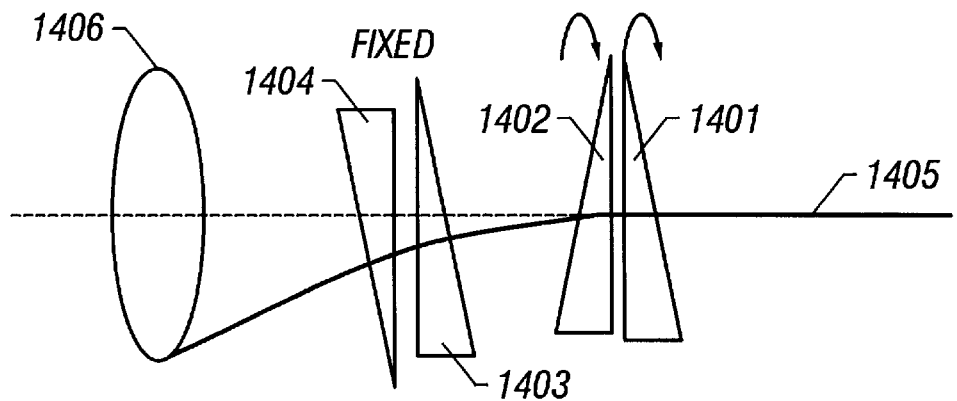
FIG. 14A is a schematic diagram illustrating the operation of prisms to direct the broadcast laser light according to an embodiment of the invention.
Figure 14B:
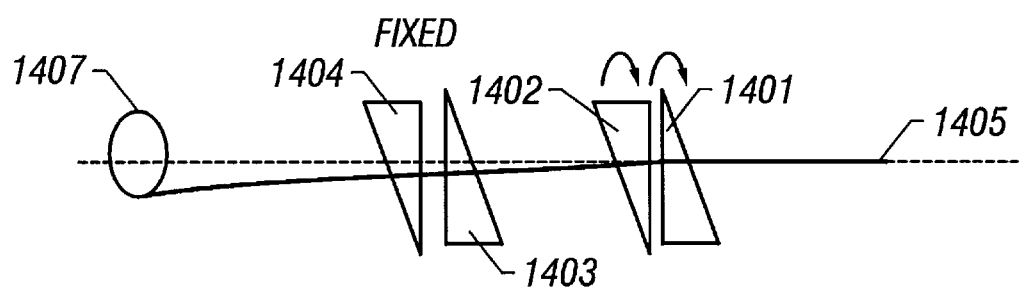
FIG. 14B is a schematic diagram of the prisms used to direct the transmitted laser beam in a pattern according to another embodiment of the invention.
Figure 14C:
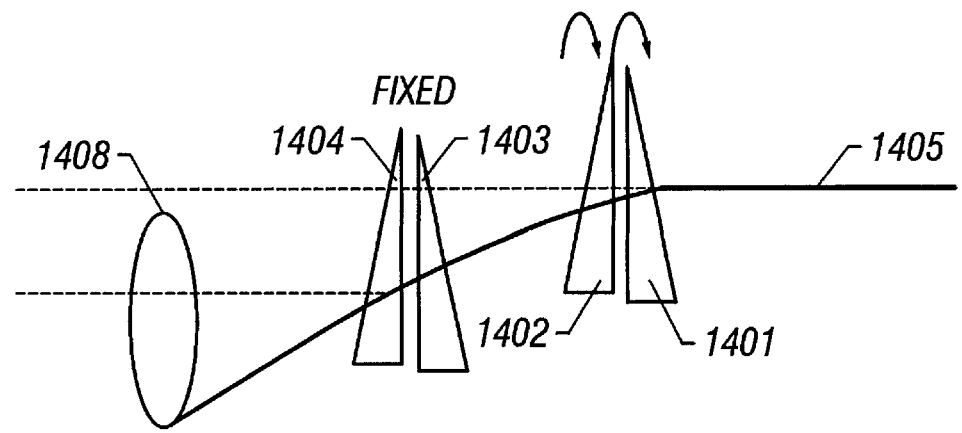
FIG. 14C is a schematic diagram of the prisms used to direct the transmitted laser beam in a pattern according to still a further embodiment of the invention.

The laser transmitter works by firing a solid state laser through the scanner mechanism. The scanner mechanism shown in FIG. 14 consists of 4 rotatable prisms. The first set of prisms, 1401 and 1402, controls the high-speed scan rate of the beam. If the two prisms are out of phase as in FIG. 14A, and both rotating in the same direction, they will produce a circle 1406. If they are in phase as in FIG. 14B, they will point straight ahead. Thus, a spiral can as seen in FIG. 3A can be produced by spinning prisms 1402 and 1401 in the same direction, and slowly varying their phase relative to each other. Spinning prism 1402 in the opposite direction of prism 1401 can make a line scan. This produces a scan seen in FIG. 2. The second set of prisms 1403 and 1404 are used to point the centerline of the scan pattern. If prisms 1403 and 1404 are in phase as shown in FIG. 14A, the centerline of the scan pattern will be straight ahead. If the prisms 1403 and 1404 are out of phase as in FIG. 14C, the pattern will be deflected off centerline. Thus for the push broom scan seen in FIG. 2, prisms 1403 and 1404 are out of phase deflecting the centerline of the scan pattern downward, and prisms 1401 and 1402 are spinning in opposite directions, creating the line scan. For the spiral scan seen in FIG. 3A, prisms 1403 and 1404 are in phase, deflecting the centerline of the scan pattern straight forward, and prisms 1401 and 1402 are spinning in the same direction with a slowly changing phase relationship. For the raster scan seen in FIG. 3, prisms 1403 and 1404 are spinning slowly in opposite directions, slowly line scanning the centerline of the high speed scan pattern, while prisms 1401 and 1402 are spun rapidly in opposite directions creating a line scan. It can be seen that this arrangement of prisms gives great flexibility in scan patters, and will even allow prisms 1403 and 1404 to cause a scan pattern to track a target across the filed of view of the receiver, while prisms 1401 and 1402 create a small conical scan pattern on the target.

Figure 16:
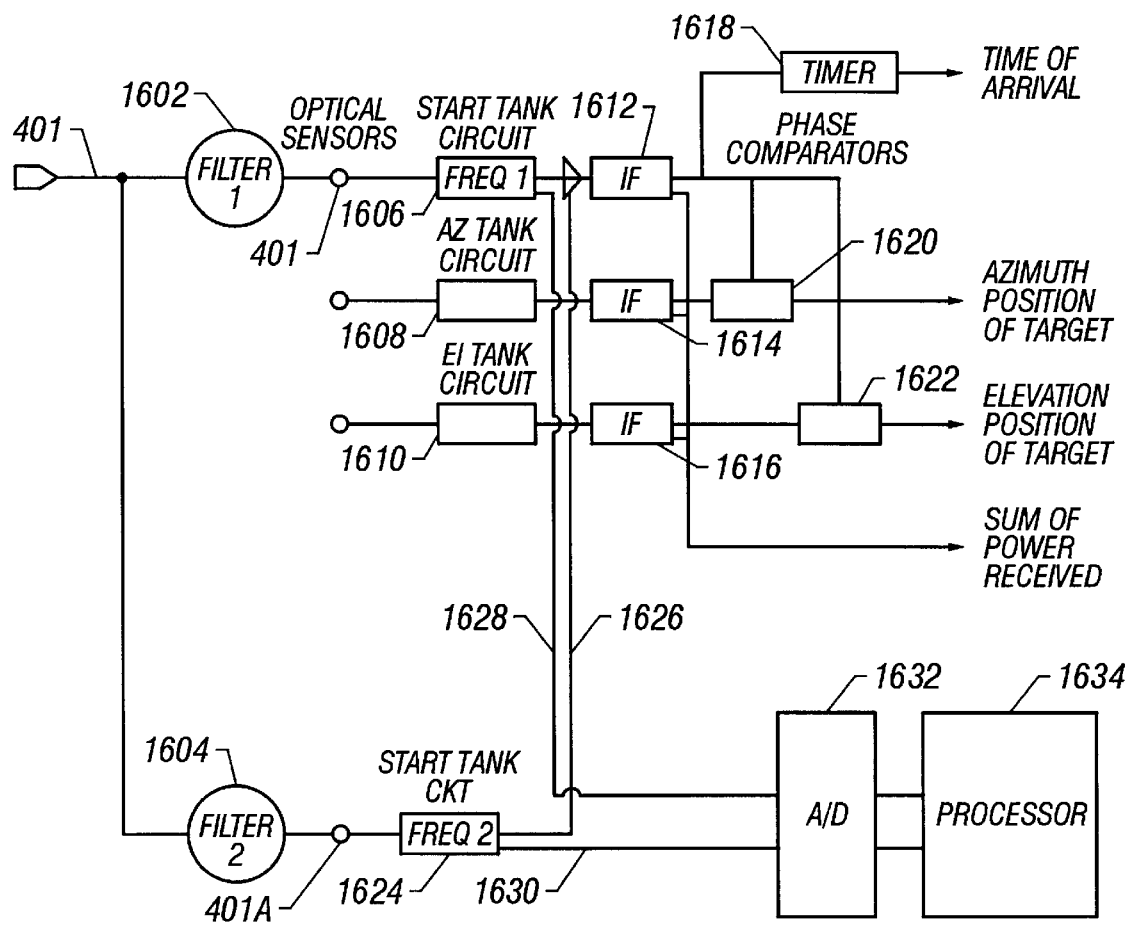
FIG. 16 is a block diagram of an embodiment of the invention adapted to analyze to multiple frequencies of received laser radiation.

FIG. 16 is a block diagram of a version of the invention adapted to analyze by-chromatic, or two-color, laser radiation reflected from the target. In this case, the laser beam projected by the missile is passed through a frequency convertor so that the target is illuminated by a laser beam consisting of two separate frequencies of laser light. The reflected laser light is detected by the staring array and passed on the start optical fiber 401 to filters 1602 and 604. Filter 1602 only passes light of the first transmitted frequency to optical sensor 401. Likewise, filter 1604 only passes light of the second transmitted frequency to optical sensor 401A. Optical sensors 401 and 401A convert the received light into an electronic signal which is then passed to start tank circuits 1606 and 1624, respectively. Optical energy from the azimuth and elevation optical fibers is passed to azimuth tank circuit 1608 and elevation tank circuit 1610, respectively. The output of these circuits is then passed to intermediate frequency amplifiers 1614 and 1616 and phase comparators 1620 and 1622, respectively. The operation of the azimuth and elevation circuits is substantially the same as described earlier, and will not be further described here.

In the version of the invention shown in FIG. 16, start tank circuits 1606 and 1624 are used to generate the three-dimensional image of the target area and determine the composition of the target by comparison of the ratio of the energy of the received optical signals. More specifically, it is first seen that the output signal from start tank circuit 1624 is passed through signal line 1626 where it is summed with the output of start tank circuit 1606 and passed to the intermediate frequency amplifier 1612. The signal from intermediate frequency amplifier 1612 is then based compared with the signals from azimuth and elevation tank circuits 1608 and 1610 to determine a three-dimensional image of the target in the manner previously described.

Second, the output from start tank circuit 1606 is passed on signal line 1628 to analog-to-digital convertor 1632. Similarly, the output of start tank circuit 1624 is passed on signal line 1632 analog to digital convertor 1632. Analog to digital convertor 1632 generates a digital representation of the power levels received from the start tank circuits. This digital information is then passed to processor 1634 which determines the ratio of the power levels received from the start tank circuits and compares the ratio to the reflectivity ratios of known objects stored in computer memory (not shown). This information can then be used with conventional target selection algorithms known to those with skill in the art. For example, the information will assist the missile in determining whether the reflected optical energy is from the painted surface of an enemy tank, or whether it is from a bush which coincidentally is shaped similarly to an enemy tank.

The filters 1602 and 1604 typically are narrow band dichromic interference filters. The band width of the filters is as narrow as the incoming angle of incidence that the light will allow. Suitable start tank circuits 1606 and 1624 have described in other embodiments of the invention.

In a still further embodiment of the invention, the two-color determination may be combined with the distance measuring circuit described in previous embodiments of the invention. In this case, the timing circuit 1628 maybe added to the guidance circuit so that the missile is capable of determining a three-dimensional image of the target, an accurate distance measurement to the target, and the chemical composition of the object reflecting the laser radiation. The timing circuit 1618 may be substantially similar to the distance measuring circuit shown in other embodiments of the invention, such as circuit 500 shown in FIG. 8.

What is claimed is:

1. A method for using laser radiation to determine the nature of a target, the method comprising:
   transmitting a beam of laser radiation to a target, the beam having at least two frequencies of radiation;
   receiving reflected laser radiation from the target through a plurality of apertures that are coupled by optical fibers to a plurality of tank circuits, each tank circuit being responsive to a frequency in the beam;
   generating a signal from each start tank circuit responsive to its received laser radiation;
   determining a ratio of the signal from at least two of the tank circuits, the ratio being responsive to the amount of reflected electromagnetic radiation from the target for the at least two frequencies of transmitted laser radiation;
   comparing the ratio to known reflectivity ratios to determine the nature of the target.

2. A method as in claim 1 further comprising the step of determining the azimuth angle of the received laser radiation.

3. A method as in claim 2 wherein the azimuth angle of the received laser radiation is determined by passing the received laser radiation from the apertures to an azimuth tank circuit through a plurality of azimuth optical fibers, the length of each azimuth stop optical fiber being related to the azimuth angle of the laser radiation received by its respective aperture.

4. A method as in claim 3 wherein the elevation angle of the received laser radiation is determined by passing the received laser radiation from the apertures to an elevation tank circuit through a plurality of elevation optical fibers, the length of each elevation stop optical fiber being related to the elevation angle of the laser radiation received by its respective aperture.

5. A method as in claim 1 further comprising the step of determining the elevation angle of the received laser radiation.

6. A method as in claim 1 further comprising using an elevation stop optical fiber attached to each aperture; the length of each elevation stop optical fiber being related to the elevation angle of the laser radiation received by its respective aperture, each elevation optical fiber being coupled to an elevation tank circuit.

7. A laser guidance system for a vehicle, the guidance system comprising:
   a laser that transmits a beam of laser radiation to a target, the beam having at least first and second frequencies of radiation;
   a staring array of apertures for receiving laser radiation reflected from the target, each aperture being coupled to a first start tank circuit by a first start optical fiber and being responsive to the first frequency of radiation, an azimuth tank circuit by an azimuth optical fiber and an elevation tank circuit by an elevation optical fiber, the length of the start optical fibers being the same for all apertures in the staring array, the length of the azimuth optical fibers being related to the azimuth angle of the received laser radiation from their respective apertures, and the length of the elevation optical fibers being related to the elevation angle of the received laser radiation from their respective apertures;
   an azimuth comparator circuit that determines the azimuth phase difference between a signal from the start tank circuit and a signal from the azimuth tank circuit;
   an elevation comparator circuit that determines the elevation phase difference between a signal from the start tank circuit and a signal from the elevation tank circuit;
   an oscillator;
   a transmitter tank circuit that generates a signal responsive to the transmission of the laser beam;
   a pulse counter that counts the number of pulses from the oscillator between the time the laser beam is transmitted and a signal is generated by the start tank circuit;
   a receive phase comparator that determines the receive phase difference between a signal from the start tank circuit and a signal from the oscillator;
   a transmit phase circuit that determines the transmit phase difference between a signal from the transmitter tank circuit and a signal from the oscillator;
   a circuit that determines a three dimensional image of the target based on the azimuth phase difference, the elevation phase difference, the number of pulses counted, the receive phase difference and the transmit phase difference;
   a second start tank circuit that is activated by the second frequency of received laser radiation;
   a comparator circuit that determines the ratio of the signal from the first and second start tank circuits, the ratio being responsive to the amount of reflected energy from the target for each frequency of transmitted radiation;
   a processor circuit that compares the ratio to known reflectivity ratios of predetermined objects;
   a guidance circuit that directs the vehicle to the target based on the three dimensional image and the comparison of the ratio with the known reflectivity ratios.

8. A laser guidance system as in claim 7 further comprising a push broom array of apertures, each aperture in the push broom array being coupled to the start tank circuit by a start optical fiber and to the azimuth tank circuit by an azimuth optical fiber.

9. A laser guidance system as in claim 7 further comprising a circuit for causing the vehicle to select whether it is guided by signals received from the push broom array or the starring array.

10. A laser guidance system as in claim 7 further comprising a scanning apparatus for sweeping the laser beam in a spiral pattern.

11. A laser guidance system as in claim 10 wherein the scanning apparatus comprises at least two pairs of optical prisms, the first pair being stationary and optically in phase and the second pair being rotatable in a common direction with the phase between the prisms being variable in such a manner as to cause the transmitted laser beam to travel in a spiral pattern about a transverse axis to the apparatus.

12. A laser guidance system as in claim 7 further comprising a plurality of intermediate frequency filters that filter the signals from the start tank circuit, the azimuth tank circuit and the elevation tank circuit.

13. A laser guidance system as in claim 7 further comprising an intermediate frequency filter that filters the signal from transmitter tank circuit.

* * * * *

UNITED STATES PATENT AND TRADEMARK OFFICE
CERTIFICATE OF CORRECTION

PATENT NO. : 6,302,355 B1
DATED : October 16, 2001
INVENTOR(S) : Bradley Sallee and Joe Gleave It is certified that error appears in the above-identified patent and that said Letters Patent is hereby corrected as shown below:

Title page,
Item [73], "Assignee", please delete "Systems" and insert therefor -- SYSTEMS --.

Column 2,
Line 12, following "laser" and before "tank", please insert -- radiation reflected from the target. Each aperture is coupled to a start tank circuit by a start optical fiber, an azimuth tank circuit by an azimuth optical fiber and an elevation --.

Column 5,
Line 61, please delete "Modem" and insert therefor -- Modern --.

Column 6,
Lines 16-21, please delete each occurrence of "comer" and insert therefor -- corner --.

Column 13,
Line 9, please delete "idiode" and insert therefor -- diode --.

Signed and Sealed this

Twentieth Day of August, 2002

*Attest:*

*Attesting Officer*

JAMES E. ROGAN
*Director of the United States Patent and Trademark Office*